US012695966B2

(12) United States Patent
Harada et al.

(10) Patent No.: US 12,695,966 B2
(45) Date of Patent: Jul. 28, 2026

(54) VEHICULAR CAMERA

(71) Applicant: Panasonic Automotive Systems Co., Ltd., Kanagawa (JP)

(72) Inventors: Takeshi Harada, Kanagawa (JP); Kouichi Kawamoto, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 102 days.

(21) Appl. No.: 18/783,161

(22) Filed: Jul. 24, 2024

(65) Prior Publication Data

US 2025/0039522 A1 Jan. 30, 2025

(30) Foreign Application Priority Data

Jul. 26, 2023 (JP) .................................. 2023-121955

(51) Int. Cl.
| | |
|---|---|
| *H04N 23/52* | (2023.01) |
| *G02B 7/02* | (2021.01) |
| *H04N 23/51* | (2023.01) |
| *H04N 23/54* | (2023.01) |
| *H04N 23/90* | (2023.01) |

(52) U.S. Cl.
CPC .............. *H04N 23/52* (2023.01); *G02B 7/02* (2013.01); *H04N 23/51* (2023.01); *H04N 23/54* (2023.01); *H04N 23/90* (2023.01)

(58) Field of Classification Search
CPC ........ H04N 23/52; H04N 23/51; H04N 23/54; H04N 23/90; G02B 7/02
USPC ....................................................... 348/148
See application file for complete search history.

(56) References Cited

U.S. PATENT DOCUMENTS

| | | | |
|---|---|---|---|
| 2011/0199485 A1* | 8/2011 | Nakamura | ........... G02B 13/001 |
| | | | 348/148 |
| 2013/0242587 A1 | 9/2013 | Hirabayashi et al. | |
| 2015/0222795 A1* | 8/2015 | Sauer | ...................... B60R 11/04 |
| | | | 348/148 |
| 2018/0261912 A1* | 9/2018 | Mizuno | .................... H01Q 1/32 |

(Continued)

FOREIGN PATENT DOCUMENTS

| | | |
|---|---|---|
| JP | 2013029614 A | 2/2013 |
| JP | 2013109188 A | 6/2013 |

(Continued)

OTHER PUBLICATIONS

Notice of Reason for Refusal, mailed Apr. 14, 2026, for Japanese Patent Application No. 2023-121955. (4 pages) (with Translation).

*Primary Examiner* — Matthew David Kim
(74) *Attorney, Agent, or Firm* — Seed Intellectual Property Law Group LLP

(57) ABSTRACT

The present disclosure relates to a vehicular camera. At least a part of a flange end surface of a flange portion of a lens unit faces an inner surface of a first shield. A second shield includes at least one contact portion disposed along the flange end surface of the flange portion from a second flange surface of the flange portion on at least one side in a plan view of the flange portion. At least a part of the contact portion of the second shield is in contact with the first shield. A shield end of the first shield is disposed at a position closer to a first flange surface of the flange portion than the at least a part of the contact portion of the second shield in a direction along the optical axis.

17 Claims, 14 Drawing Sheets

(56)  References Cited

U.S. PATENT DOCUMENTS

| | | | | |
|---|---|---|---|---|
| 2019/0103716 | A1 | 4/2019 | Yamazaki | |
| 2019/0121050 | A1* | 4/2019 | Park | G02B 7/02 |
| 2019/0143907 | A1 | 5/2019 | Byrne et al. | |
| 2020/0195822 | A1 | 6/2020 | Agawa et al. | |
| 2020/0252527 | A1 | 8/2020 | Nakamura | |
| 2021/0127532 | A1* | 4/2021 | Persson | H04N 23/57 |
| 2021/0197733 | A1* | 7/2021 | Percival | G03B 17/02 |
| 2021/0297564 | A1* | 9/2021 | Tokito | G03B 11/045 |
| 2021/0368132 | A1* | 11/2021 | Kimura | G03B 17/02 |
| 2022/0048442 | A1* | 2/2022 | Puchini | F16M 11/18 |
| 2022/0159160 | A1* | 5/2022 | Abe | H04N 23/52 |
| 2022/0217257 | A1* | 7/2022 | Conger | H04N 23/57 |
| 2023/0008374 | A1* | 1/2023 | Owaki | G03B 30/00 |
| 2024/0276083 | A1* | 8/2024 | Nakamura | G02B 7/02 |

FOREIGN PATENT DOCUMENTS

| | | | |
|---|---|---|---|
| JP | 2013196844 | A | 9/2013 |
| JP | 2014075825 | A | 4/2014 |
| JP | 2018173434 | A | 11/2018 |
| JP | 2018197798 | A | 12/2018 |
| JP | 2019050516 | A | 3/2019 |
| JP | 2019067740 | A | 4/2019 |
| JP | 2019078986 | A | 5/2019 |
| JP | 2019208190 | A | 12/2019 |
| JP | 2023004217 | A | 1/2023 |
| WO | 2018221210 | A1 | 12/2018 |
| WO | WO 2021125074 | A1 | 6/2021 |

* cited by examiner

VEHICULAR CAMERA

CROSS-REFERENCE TO RELATED APPLICATIONS

This application is based on and claims priority under 35 USC 119 from Japanese Patent Application No. 2023-121955 filed on Jul. 26, 2023, the entire content of which is incorporated herein by reference.

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active as disclosed in, for example, JP2014-075825A and JP2019-067740A.

Required levels relating to safety, automatic driving functions, and the like, which are required for vehicles, are improved, and further improvement in performance and the like are also required for vehicular cameras.

The present disclosure relates to a technique for providing a new vehicular camera capable of ensuring conduction between two shields while achieving ease of assembly.

SUMMARY

A vehicular camera includes a lens unit including at least one lens, a first tubular portion configured to accommodate the at least one lens, and a flange portion formed around the first tubular portion with an optical axis of the lens as a center and having a first flange surface, a second flange surface opposite to the first flange surface, and a flange end surface connecting the first flange surface and the second flange surface, a circuit board having a first surface, a second surface opposite to the first surface, and an end surface connecting the first surface and the second surface, an imaging element mounted on the first surface of the circuit board and disposed on the optical axis of the at least one lens, a housing to which the flange portion of the lens unit is fixed, the housing having a second tubular portion configured to accommodate at least the circuit board and the imaging element, a first shield made of metal and disposed in an internal space formed by the second tubular portion of the housing and the second flange surface of the flange portion of the lens unit so as to surround the circuit board, and a second shield made of metal and disposed along the second flange surface of the flange portion of the lens unit so as to face the first surface of the circuit board, the second shield having a first hole corresponding to the imaging element. At least a part of the flange end surface of the flange portion of the lens unit faces an inner surface of the first shield. The second shield includes at least one contact portion disposed along the flange end surface of the flange portion from the second flange surface of the flange portion on at least one side in a plan view of the flange portion. At least a part of the contact portion of the second shield is in contact with the first shield. A shield end of the first shield is disposed at a position closer to the first flange surface of the flange portion than the at least a part of the contact portion of the second shield in a direction along the optical axis.

According to the present disclosure, at least one contact portion of the second shield is disposed along the flange end surface from the second flange surface of the flange portion. Thus, when the lens unit and the second shield are inserted into the housing in a state in which the second shield is disposed on the second flange surface of the flange portion of the lens unit, the contact portion does not become an obstacle to insertion, and thus the ease of assembly of the vehicular camera can be achieved.

Further, the shield end of the first shield is disposed at a position closer to the first flange surface of the flange portion than at least a part of the contact portion of the second shield that is in contact with the first shield. Thus, at least a part of the contact portion of the second shield is reliably in contact with the first shield, and thus conduction between the first shield and the second shield can be ensured, and the first shield and the second shield can be maintained at the same potential.

DESCRIPTION OF EMBODIMENTS

Hereinafter, an embodiment that specifically discloses a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following description and facilitate understanding of those skilled in the art. It should be noted that the accompanying drawings and the following description are provided for those skilled in the art to sufficiently understand the present disclosure, and are not intended to limit the subject matter described in the claims.

Figure 8:
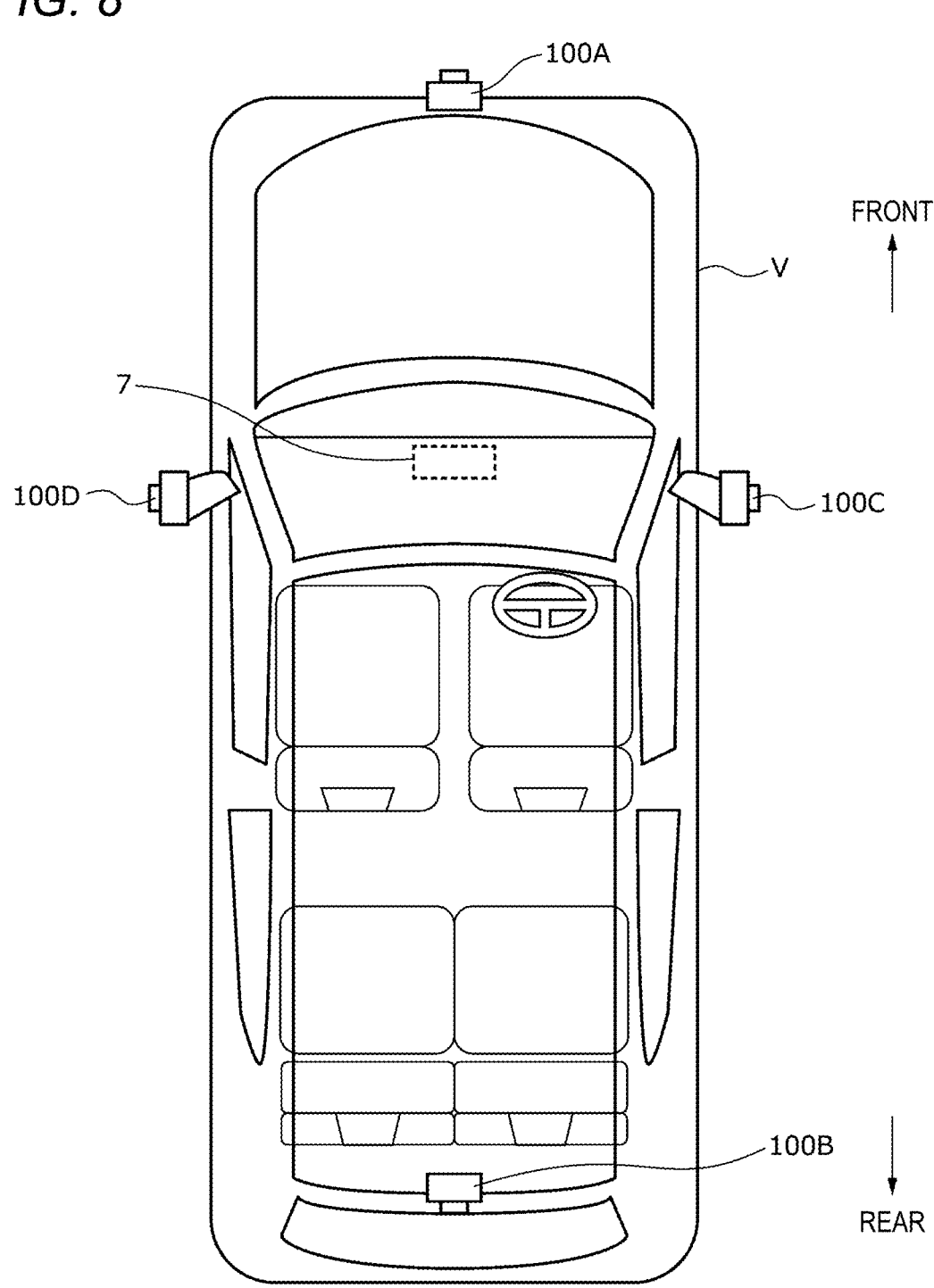
FIG. 8 is an example of a vehicle, and is a top view of the vehicle on which vehicular cameras are mounted.

FIG. 8 is an example of a vehicle, and is a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right side camera, and the vehicular camera 100D is a left side camera. The vehicular cameras 100A to 100D are, for example, wide-angle cameras having an angle of view of about 180°, and are disposed to capture images showing the entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 11:
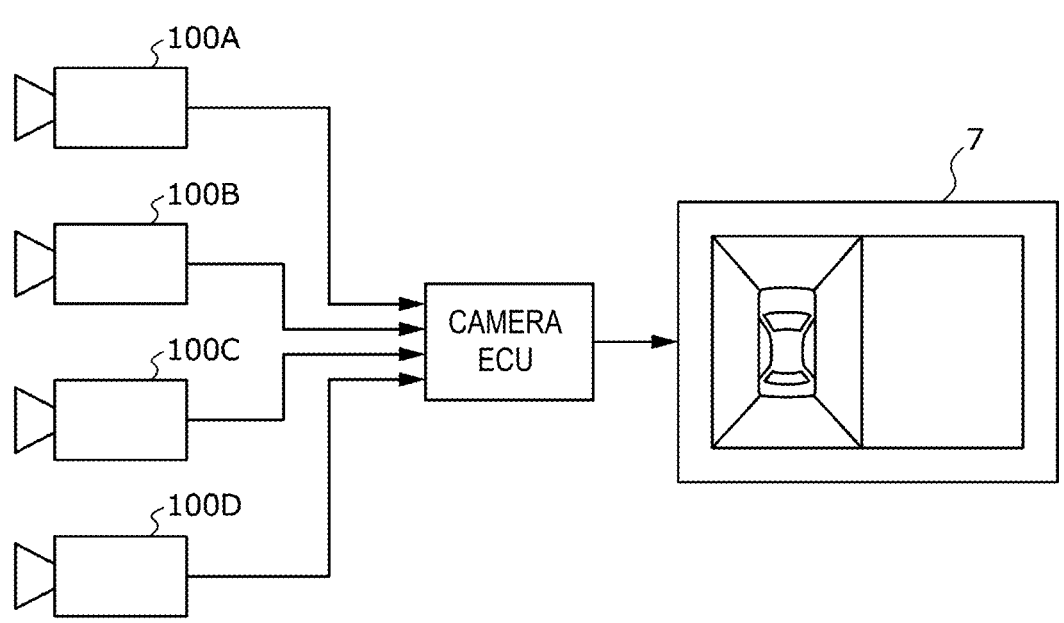
FIG. 11 is a block diagram illustrating a connection example of the vehicular cameras provided in the vehicle shown in FIG. 8, a camera ECU, and a display.

FIG. 11 is a block diagram illustrating a connection example of the vehicular cameras 100A to 100D provided in the vehicle V shown in FIG. 8, a camera ECU 110, and a display 7. The camera electronic control unit (ECU) 110 in FIG. 11 synthesizes the images captured by the vehicular cameras 100A to 100D, and displays a synthesized image on the display 7 of a navigation system disposed on an instrument panel, for example. An occupant can visually recognize the display 7 and check a situation around the vehicle V.

Figure 9:
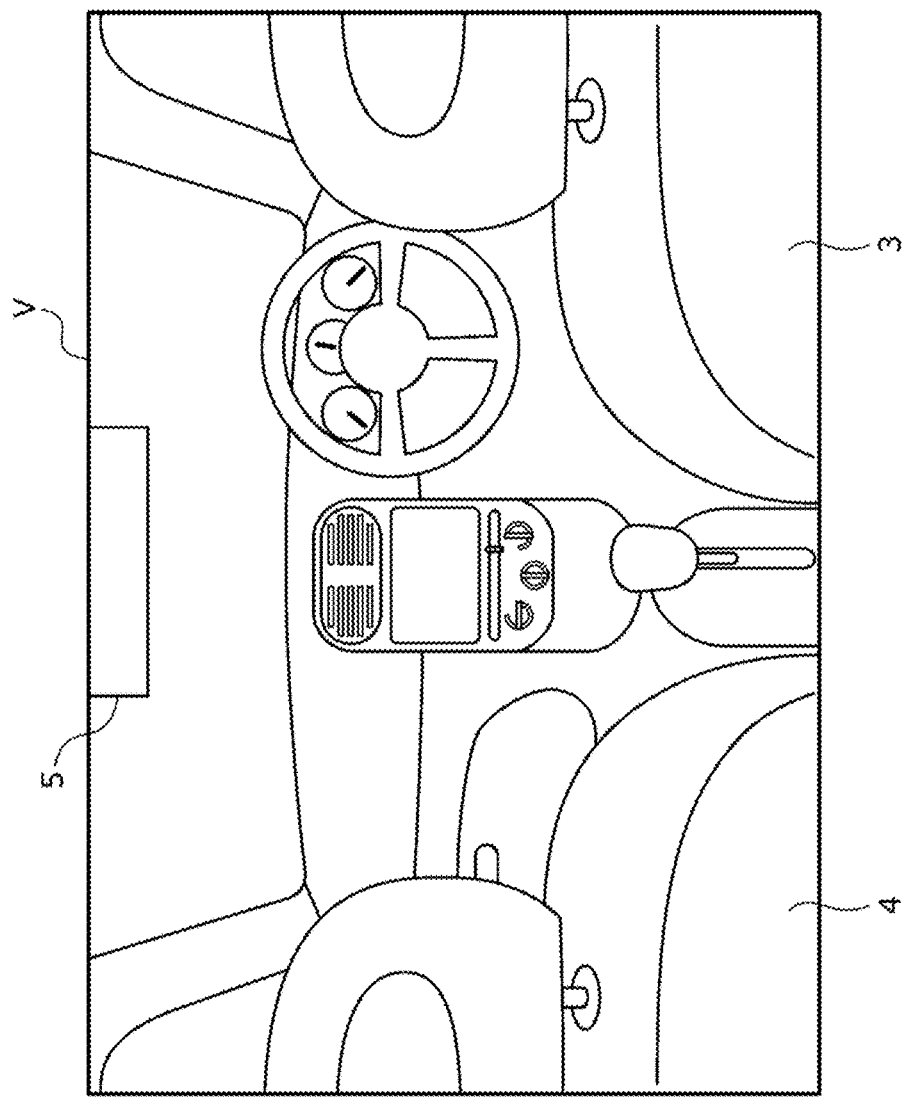
FIG. 9 is another example of the vehicle, and is a schematic diagram of a cabin of the vehicle on which the vehicular camera is mounted.
Figure 10:
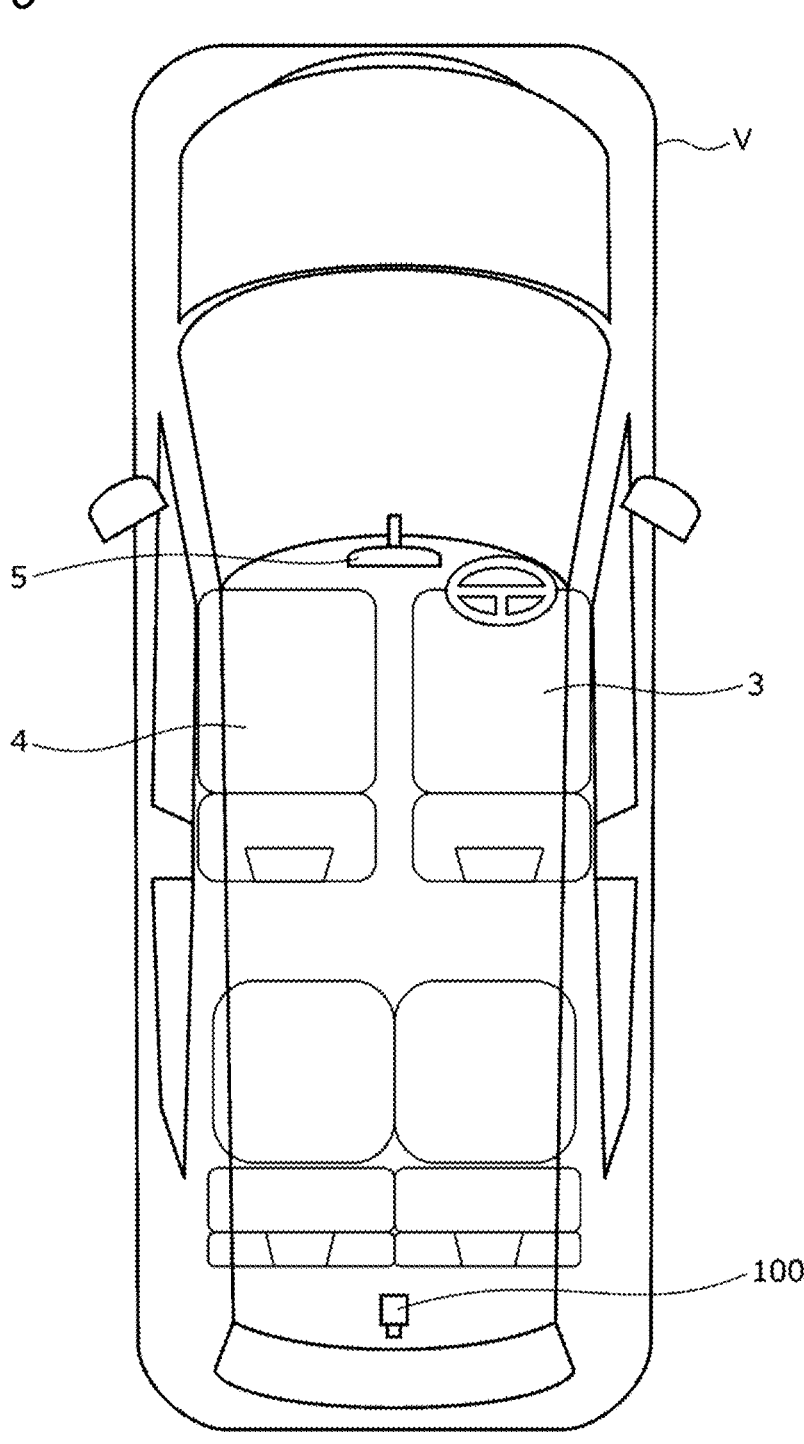
FIG. 10 is a top view of the vehicle in FIG. 9.
Figure 12:
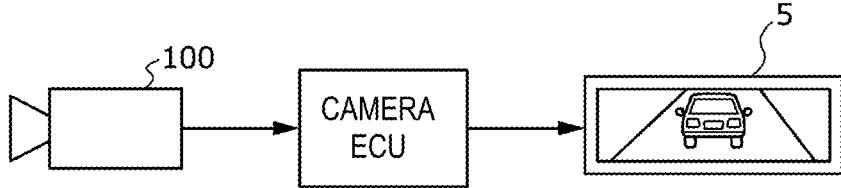
FIG. 12 is a block diagram illustrating a connection example of the vehicular camera provided in the vehicle shown in FIG. 9, a camera ECU, and a display device.

FIG. 9 is another example of the vehicle, and is a schematic diagram of a cabin of the vehicle on which the vehicular camera is mounted, and FIG. 10 is a top view of the vehicle in FIG. 9. The vehicle V includes a display device 5 (for example, an electronic rearview mirror) at an attachment position of a rearview mirror which is a front portion between a driver's seat 3 and a passenger seat 4 in a cabin 2. Further, the vehicle V is provided with the vehicular camera 100 at a rear side of a vehicle body. FIG. 12 is a block diagram illustrating a connection example of the vehicular camera 100 provided in the vehicle V shown in FIG. 9, a camera ECU 111, and the display device 5. The camera electronic control unit (ECU) 111 in FIG. 12 processes an image captured by the vehicular camera 100, and the display device 5 displays the image. The occupant can visually recognize the display device 5 and check a rear situation of the vehicle V.

Figure 1A:
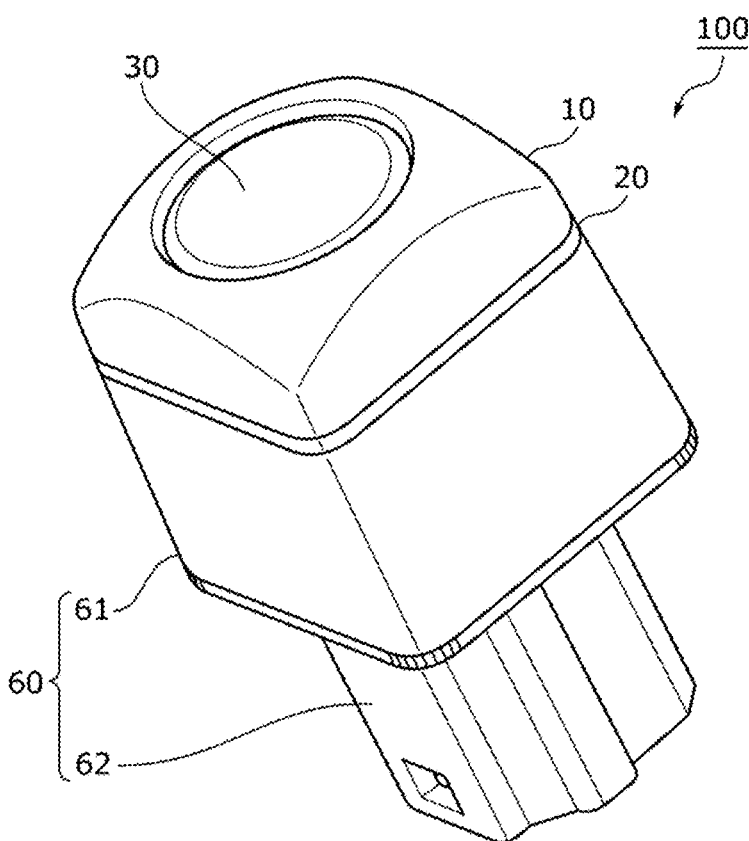
FIG. 1A is a top perspective view of a vehicular camera according to an embodiment.
Figure 1A:
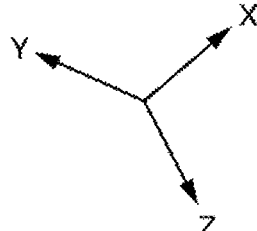
Figure 1B:
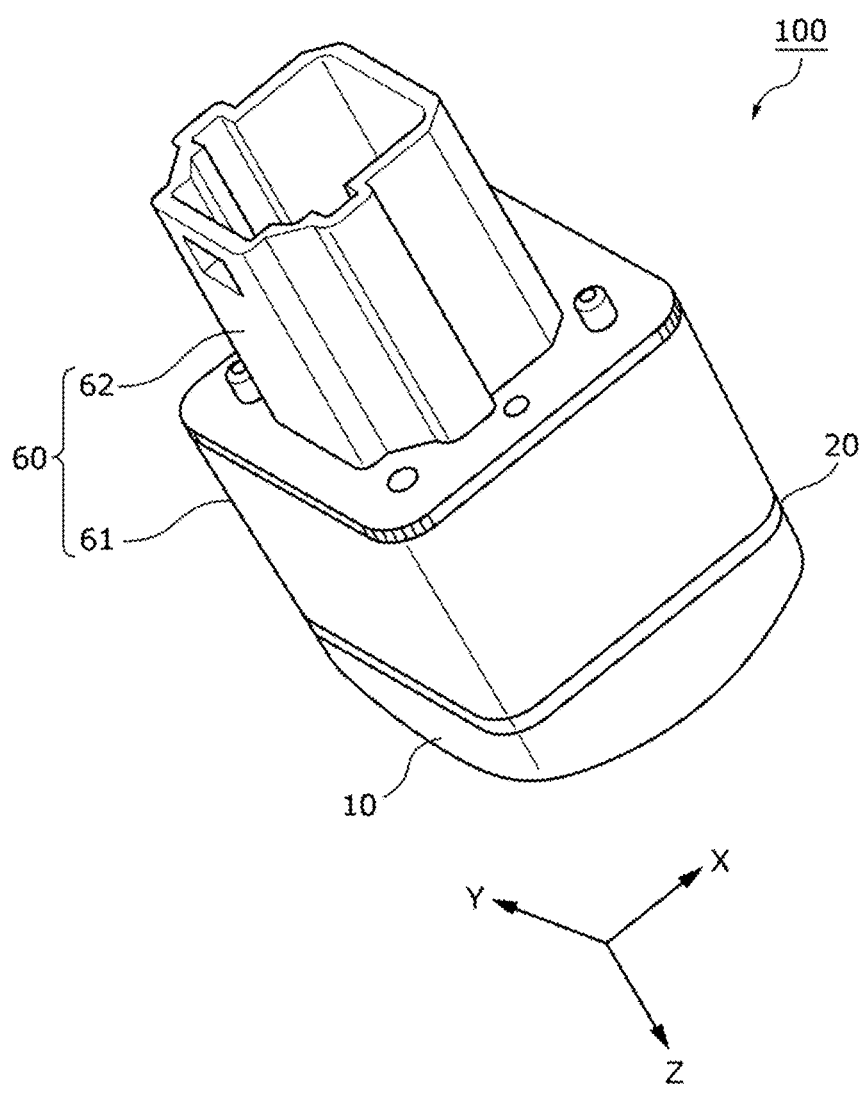
FIG. 1B is a bottom perspective view of the vehicular camera according to the embodiment.
Figure 2:
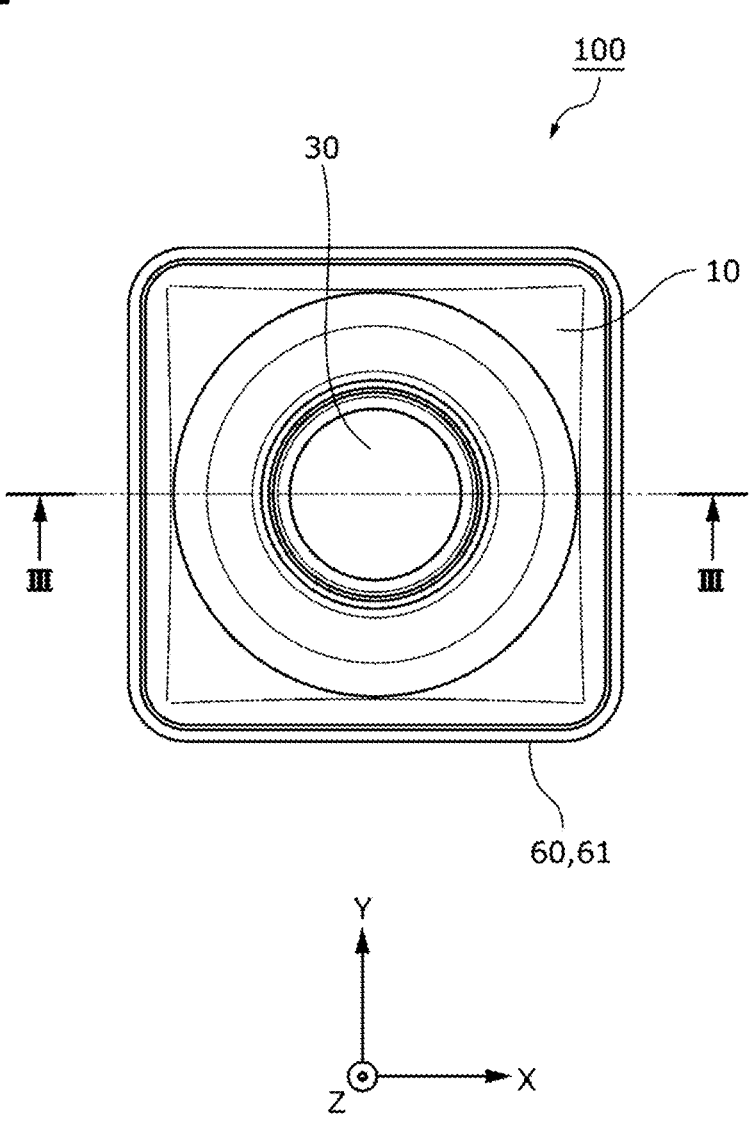
FIG. 2 is a top view of the vehicular camera according to the embodiment.
Figure 3A:
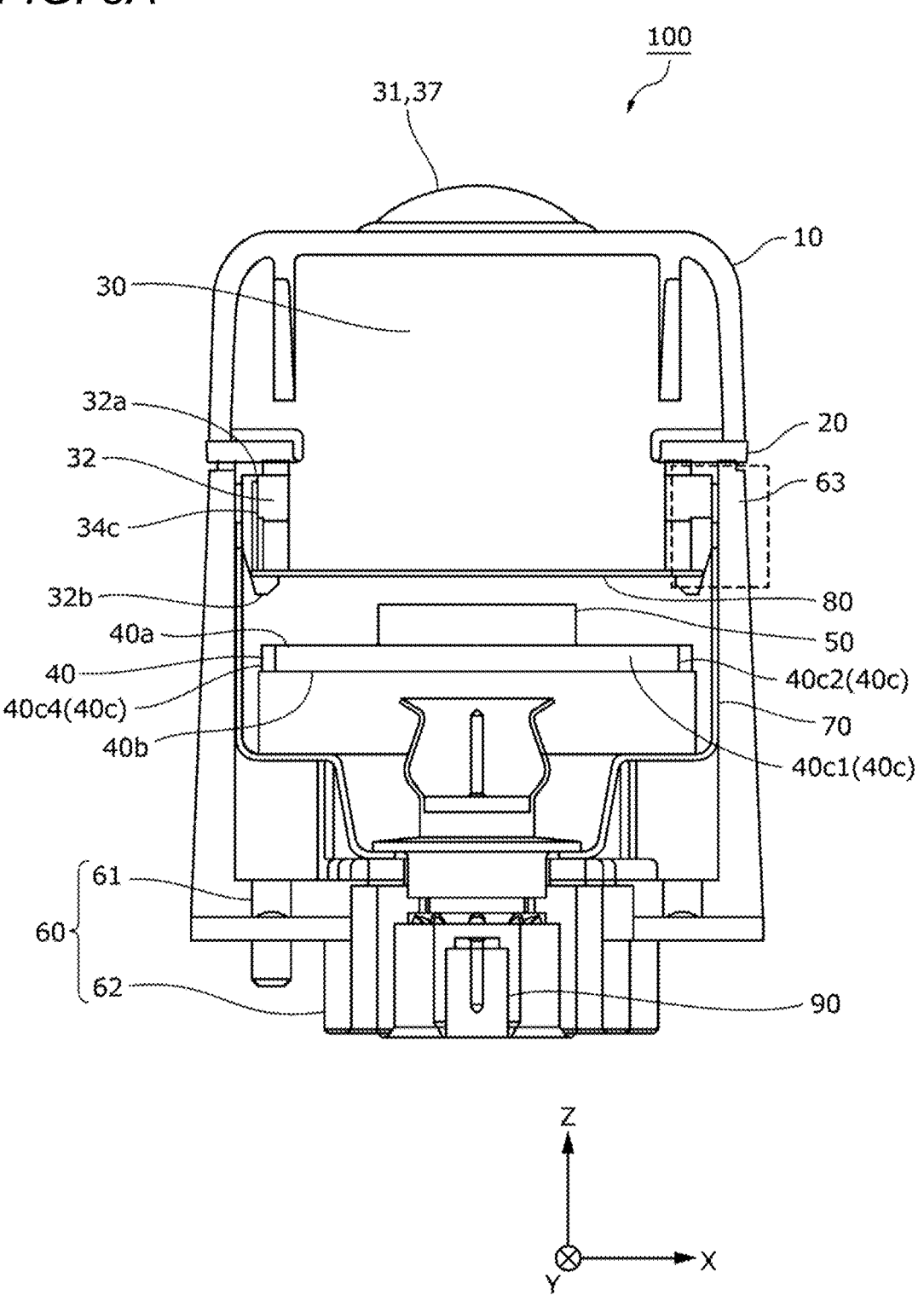
FIG. 3A is a cross-sectional view taken along a line III-III in FIG. 2.
Figure 3B:
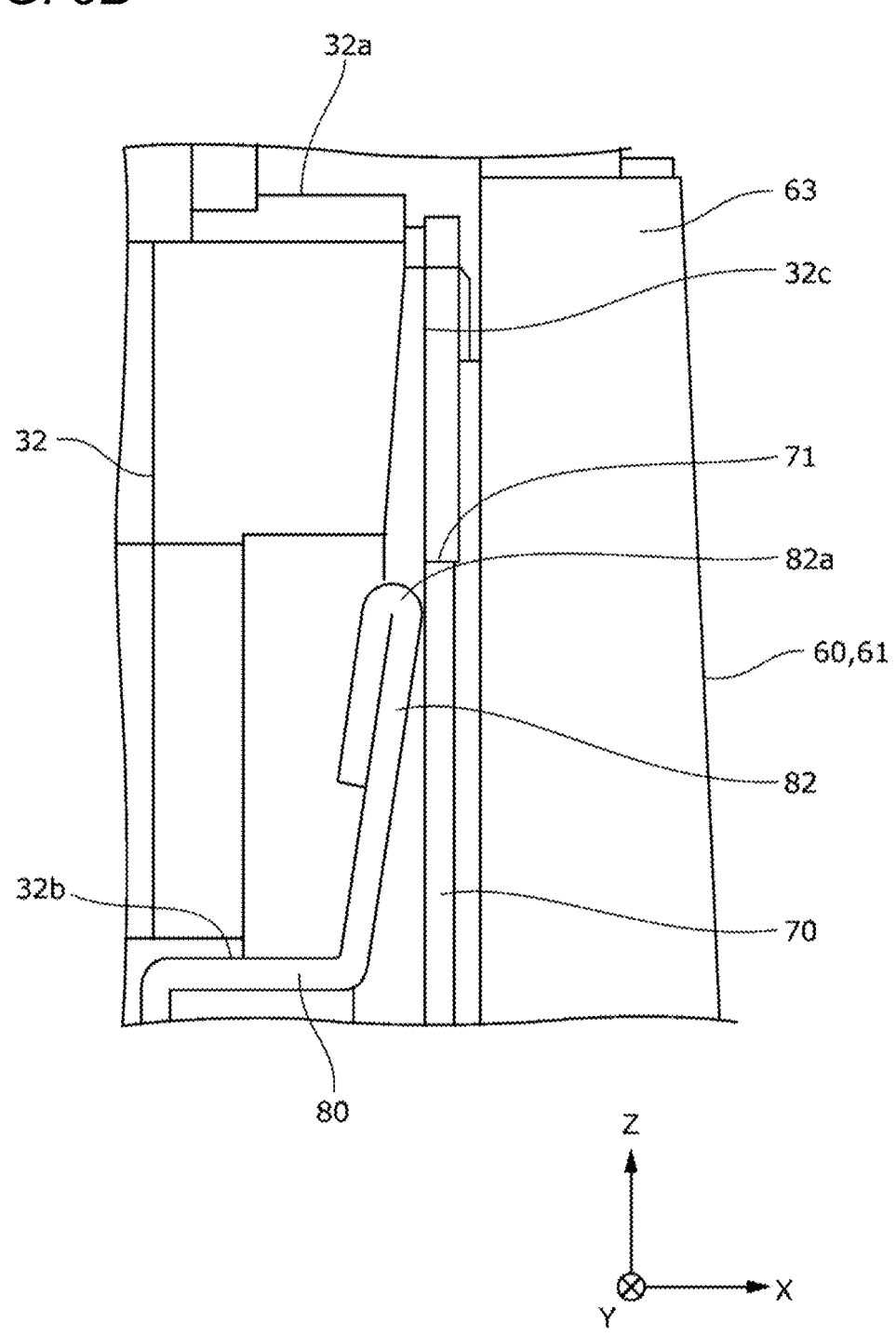
FIG. 3B is an enlarged view of a region A in FIG. 3A.

FIG. 1A is a top perspective view of the vehicular camera 100 according to the embodiment. FIG. 1B is a bottom perspective view of the vehicular camera 100 according to the embodiment. FIG. 2 is a top view of the vehicular camera 100 according to the embodiment. FIG. 3A is a view taken along a line III-III in FIG. 2, and FIG. 3B is an enlarged view of a region A in FIG. 3A. A Z axis along an optical axis of a lens of a lens unit 30 in the vehicular camera 100 (in other words, an axis along a height direction of the vehicular camera 100), an X axis that is a first axis of two axes orthogonal to the Z axis, and a Y axis that is a second axis of the two axes orthogonal to the Z axis and is also orthogonal to the X axis are defined and used in the following description.

The vehicular camera 100 according to the present embodiment includes a cap 10, a ring member 20, a lens unit 30, a circuit board 40, an imaging element 50, a housing 60, a first shield 70, and a second shield. The cap 10 is a member that is attached to the ring member 20 and protects the lens unit 30.

The ring member 20 is implemented by a rectangular annular member having a flat plate shape in a plan view (a line of sight when the vehicular camera 100 is viewed along a cross section orthogonal to the Z axis, the same applies hereinafter), and is welded to the lens unit 30 and the housing 60 by laser welding. An inner peripheral surface of the ring member 20 faces, in an XY plane direction, an outer peripheral surface of a first tubular portion 37 that constitutes a lens barrel 31 of the lens unit 30. An inner diameter of the ring member 20 has a length that allows the first tubular portion 37 (the lens barrel 31) of the lens unit 30 to be inserted.

The ring member 20 is formed of a first resin having predetermined light transmittance. The first resin is made of a material containing a light-transmitting resin. For example, the light-transmitting resin is formed of a polyester resin, a polyolefin resin, a polyamide resin, a vinyl chloride resin, a fluorine resin, or the like. As the polyester resin, polybutylene terephthalate (PBT), polyethylene terephthalate (PET), or the like can be used. As the polyolefin resin, polyethylene, polypropylene, or the like can be used. One type of light-transmitting resin or a plurality of types of light-transmitting resins may be used. In addition, a coloring material, a filler, or both may be contained in a main light-transmitting resin as long as a transmission performance of a certain level or more can be achieved.

Although the ring member 20 has a flat rectangular annular shape in the present embodiment, the shape is not limited thereto, and a welded portion may have a flat plate shape. Therefore, the shape is not limited to a polygonal shape such as a rectangular annular shape, and may be a circular annular shape or an annular shape other than the circular annular shape such as an elliptical annular shape. In addition, steps, thicknesses, and the like may not be uniform in portions other than the welded portion.

The lens unit 30 includes the first tubular portion 37 that constitutes the lens barrel 31 having a tubular shape and has a first tubular shape, and at least one lens (not shown) disposed inside the first tubular portion 37. The first tubular portion 37 has a tubular shape, and holds a lens group including, for example, a plurality of lenses inside the first tubular portion 37. The respective lenses in the lens group are arranged in a state in which respective optical axes (axes extending in an up-down direction of the paper in FIG. 3A and along the Z axis) are aligned with each other, and constitute the lens group used for capturing images of the inside and outside of a vehicle body of a vehicle.

The lens unit 30 has a flange-shaped flange portion 32 protruding from the outer peripheral surface toward the outside of the first tubular portion 37. The flange portion 32 is disposed outside the first tubular portion 37 to extend outward with respect to the optical axis of at least one lens over an entire periphery around the optical axis. A cross section of the flange portion 32 along a radial direction has a quadrilateral shape. The flange portion 32 is located in the vicinity of an opening of an internal space of the housing 60 to be described later, and protrudes toward an inner peripheral surface of the housing 60. At least a part of the flange portion 32 is joined to the housing 60 via the ring member 20.

The flange portion 32 is disposed inside a large-diameter tubular portion 61 to be described later of the housing 60 in the radial direction perpendicular to the optical axis, and includes a ring-shaped first flange surface 32a facing the ring member 20, a ring-shaped second flange surface 32b opposite to the first flange surface 32a, and a flange end surface 32c connecting the first flange surface 32a and the second flange surface 32b.

At least the second flange surface 32b of the flange portion 32 in the lens unit 30 is formed of a second resin having a first light absorptivity. The second resin is made of a material containing a light-absorbing resin. As the light-absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of light-absorbing resin or a plurality of types of light-absorbing resins may be used. A main light-absorbing resin may contain an absorbent that absorbs laser light, a coloring material, or both.

Since the second flange surface 32b of the flange portion 32 is made of the second resin, transmission of light into the internal space can be reduced. That is, the transmission of light from the outside of the vehicular camera 100 to the inside of the vehicular camera 100 can be reduced. Therefore, image quality deterioration of a captured image due to halation or the like of the imaging element 50 caused by transmitted light can be prevented. The entire flange portion 32 or the entire lens unit 30 may be formed of the second resin.

The circuit board 40 is disposed in the internal space of the housing 60, and includes a first surface 40a, a second surface 40b opposite to the first surface 40a, and an end surface 40c connecting the first surface 40a and the second surface 40b. However, two or more circuit boards may be provided.

The imaging element 50 is disposed in the internal space of the housing 60 together with the circuit board 40, receives light transmitted through the lens unit 30, and captures an optical image of a subject by photoelectric conversion based on the received light to generate a captured image of the subject. The imaging element 50 is disposed on the optical axis of at least one lens of the lens unit 30. The imaging element 50 is mounted on the first surface 40a of the circuit board 40, and light from the outside of the subject and the like can be easily guided to the imaging element 50.

The housing 60 is a tubular member having the internal space, supports the lens unit 30 directly or indirectly in some cases, and accommodates at least the circuit board 40 and the imaging element 50. The housing 60 includes the large-diameter tubular portion 61 having a second tubular shape along the optical axis and a small-diameter tubular portion 62 having a third tubular shape along the optical axis. The large-diameter tubular portion 61 constituting a second tubular portion has a larger cross-sectional area than the small-diameter tubular portion 62 constituting a third tubular portion in the XY plane direction, and has a rectangular cross section. The large-diameter tubular portion 61 accommodates the circuit board 40 and the imaging element 50 therein. The small-diameter tubular portion 62 mainly accommodates a connector 90 that secures electrical connection with the outside of the vehicular camera 100. The large-diameter tubular portion 61 and the small-diameter tubular portion 62 may be integrally formed by using a resin to be described later, and the large-diameter tubular portion 61 and the small-diameter tubular portion 62 prepared individually in advance may be joined by a method such as welding or screwing. Although the housing 60 has a rectangular tubular shape in the present embodiment, the shape is not limited thereto, and may be a polygonal tubular shape other than the rectangular tubular shape, a circular or elliptical tubular shape, or another tubular shape.

At least an end portion 63 of the large-diameter tubular portion 61 in the housing 60 is formed of a third resin having a second light absorptivity. The third resin is made of a material containing a light-absorbing resin. As the light-absorbing resin, for example, a polyamide-based resin, an olefin-based resin, a vinyl-based resin, a styrene-based resin, an acrylic-based resin, a polyester-based resin, a polycarbonate-based resin, a polyarylate-based resin, a polysulfone-based resin, a polyphenylene oxide-based resin, a polyether sulfone-based resin, or a polyetherimide-based resin can be used. One type of light-absorbing resin or a plurality of types of light-absorbing resins may be used. A main light-absorbing resin may contain an absorbent that absorbs laser light, a coloring material, or both. The second light absorptivity may be the same as or different from the first light absorptivity.

Since at least the end portion 63 of the housing 60 is made of the third resin (that is, the material including the light-absorbing resin), the transmission of light into the internal space of the housing 60 can be reduced. That is, the transmission of light from the outside of the vehicular camera 100 to the inside of the vehicular camera 100 can be reduced. Therefore, image quality deterioration of a captured image due to halation or the like of the imaging element 50 caused by transmitted light can be prevented. The entire large-diameter tubular portion 61 or the entire housing 60 may be formed of the third resin.

The ring member 20 is welded to the first flange surface 32a of the flange portion 32 of the lens unit 30 and the end portion 63 of the housing 60 by the laser welding. That is, the flange portion 32 of the lens unit 30 is fixed to the end portion 63 of the housing 60 via the ring member 20.

The first shield 70 is disposed so as to surround the circuit board 40 in an internal space formed by the large-diameter tubular portion 61 of the housing 60 and the second flange surface 32b of the flange portion 32 of the lens unit 30. The first shield 70 is made of metal, and is a tubular member formed by a method such as bending a metal plate or drawing a metal material. At least a part of the flange end surface 32c of the flange portion 32 of the lens unit 30 faces an inner surface of the first shield 70.

Figure 4:
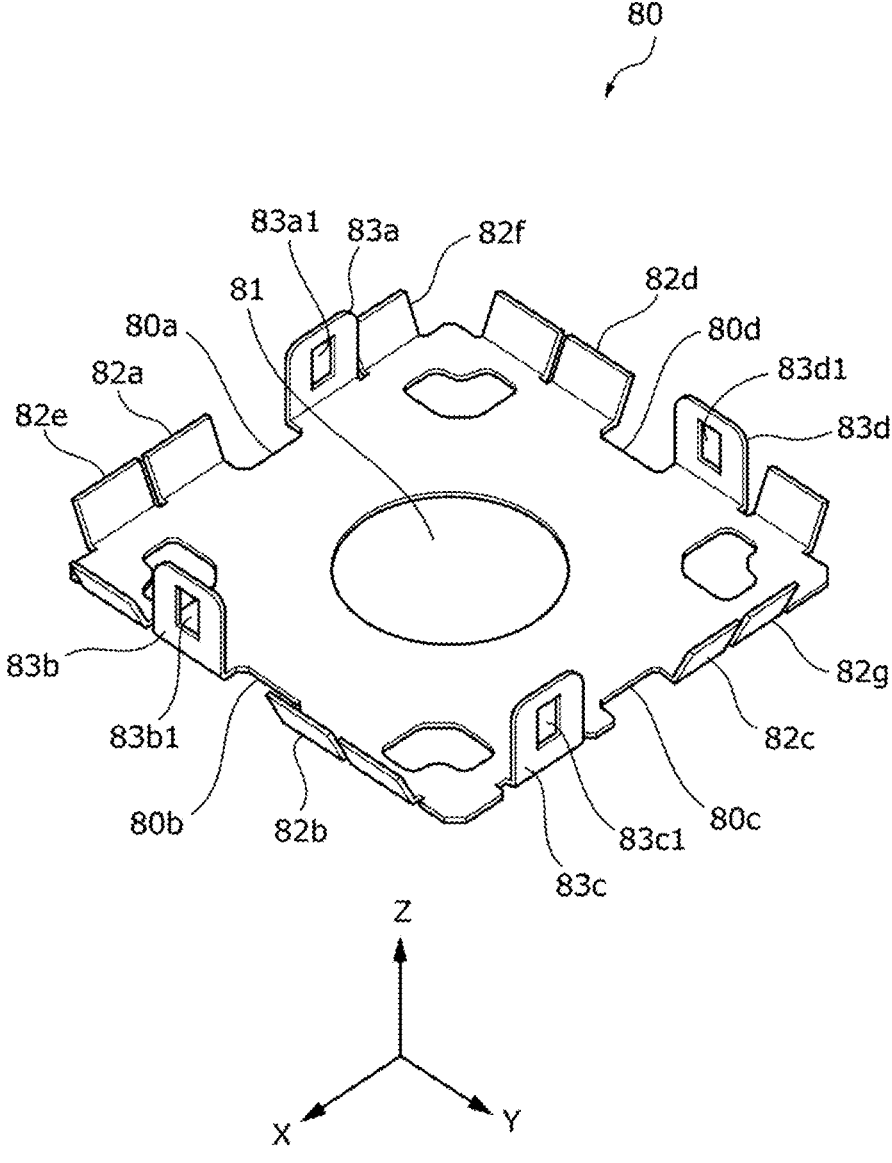
FIG. 4 is a perspective view of a second shield.

FIG. 4 is a perspective view of a second shield 80. The second shield 80 is disposed along the second flange surface 32b of the flange portion 32 of the lens unit 30 so as to face the first surface 40a of the circuit board 40, and has a first hole 81 corresponding to the imaging element 50. The second shield 80 is made of metal, and is a plate-shaped member formed by a method such as bending a metal plate.

The first shield 70 and the second shield 80 are metal members for shielding components such as the circuit board 40 and the imaging element 50 from external noise, and an imaging function of the vehicular camera 100 is exhibited by a noise shielding function of the first shield 70 and the second shield 80. Since the first shield 70 and the second shield 80 are preferably kept at the same potential (a ground potential), the first shield 70 and the second shield 80 are required to be in contact with each other.

For the above contact, the second shield 80 includes at least one contact portion 82 disposed along the flange end surface 32c of the flange portion 32 from the second flange surface 32b of the flange portion 32 on at least one side in a plan view of the flange portion 32. As shown in FIG. 3B, at least a part of the contact portion 82 is in contact with the first shield 70. A shield end 71 on the lens unit 30 side of the first shield 70 is disposed at a position closer to the first flange surface 32*a* of the flange portion 32 than at least a part of the contact portion 82 of the second shield 80 in a direction along the optical axis.

Figure 5A:
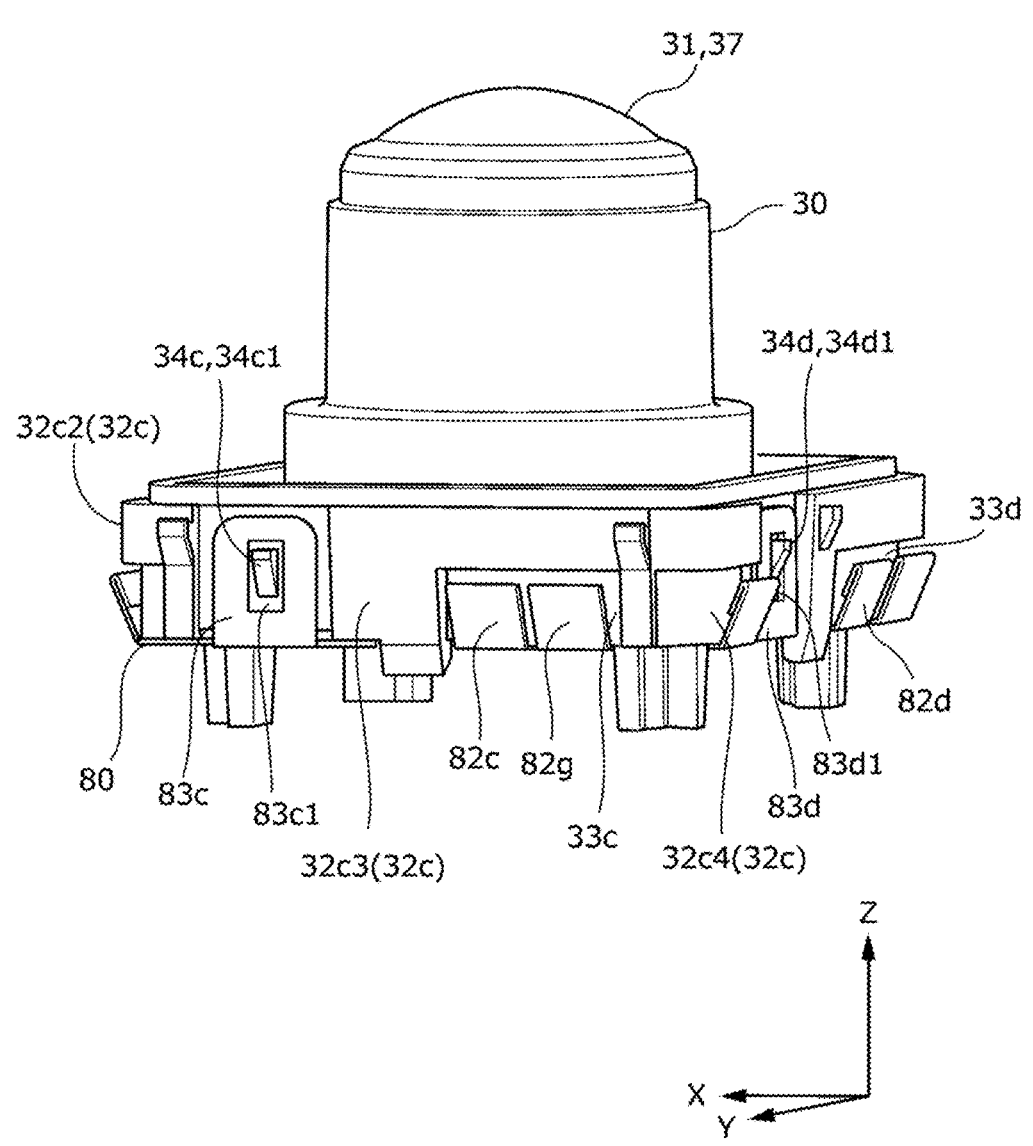
FIG. 5A is a perspective view of an assembly of a lens unit and the second shield.
Figure 5B:
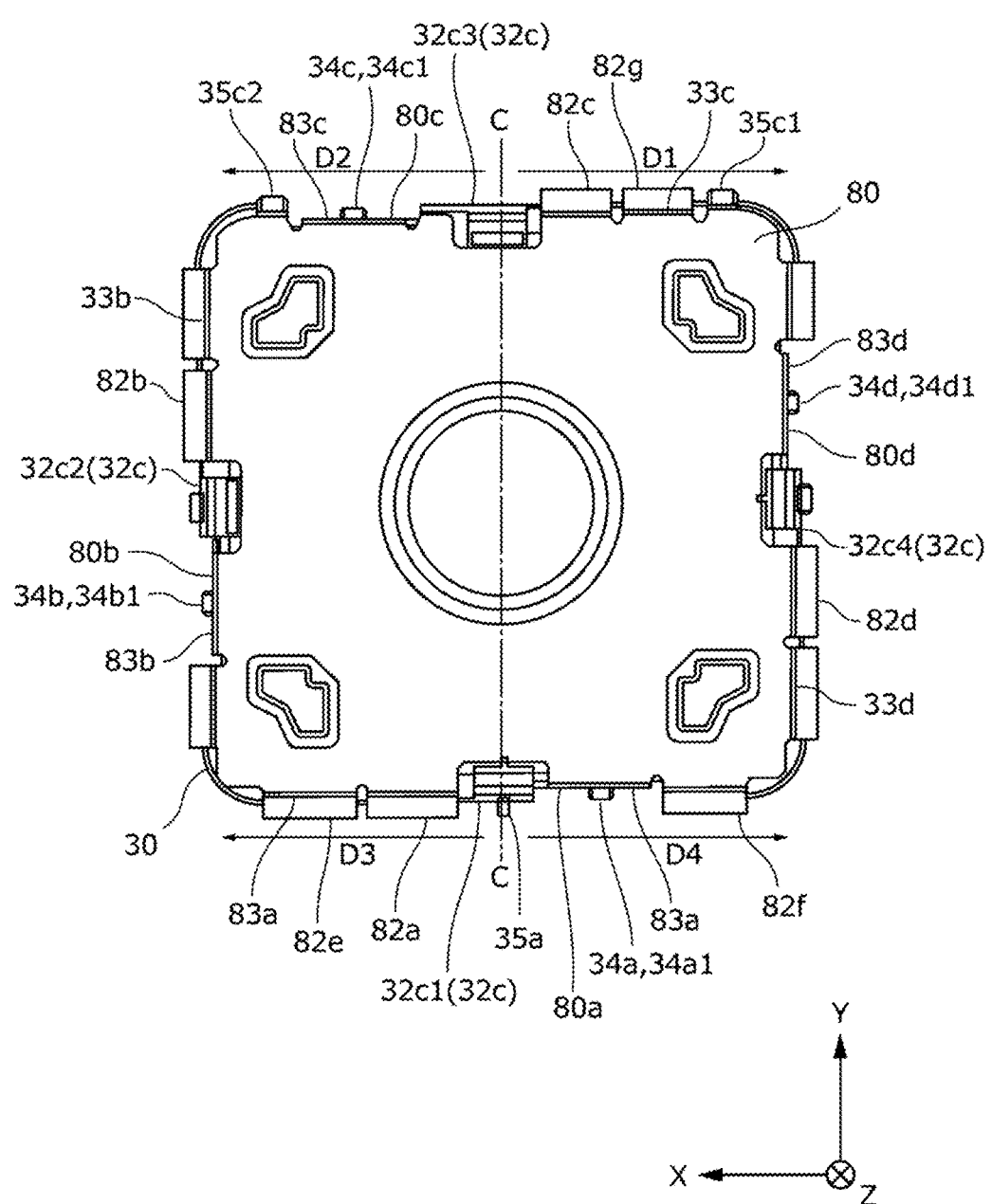
FIG. 5B is a bottom view of the assembly of the lens unit and the second shield.

FIG. 5A is a perspective view of an assembly of the lens unit 30 and the second shield 80, and FIG. 5B is a bottom view of the assembly of FIG. 5A. In assembling the vehicular camera 100, the components such as the circuit board 40 and the imaging element 50 are disposed in the internal space of the housing 60, and then the assembly shown in FIGS. 5A and 5B is inserted into the housing 60. That is, before the assembly is inserted into the housing 60, the lens unit 30 and the second shield 80 are assembled as shown in FIGS. 5A and 5B.

When the assembly is inserted into the housing 60, the contact portion 82 is elastically bent inward (toward the optical axis) by the contact with the inner surface of the first shield 70 disposed in the housing 60. When the assembly is accommodated in the housing 60, an elastic force that tends to expand outward is generated in the contact portion 82, and the contact between the first shield 70 and the second shield 80 is maintained by the elastic force.

In the vehicular camera 100 according to the embodiment, at least one contact portion 82 of the second shield 80 is disposed along the flange end surface 32*c* of the flange portion 32 from the second flange surface 32*b* of the flange portion 32. That is, the contact portion 82 extends in a direction opposite to an insertion direction when the assembly is inserted. Thus, when the lens unit 30 and the second shield 80 are inserted into the housing 60 in a state in which the second shield 80 is disposed on the second flange surface 32*b* of the flange portion 32 of the lens unit 30 as shown in FIGS. 5A and 5B, the contact portion 82 is unlikely to be an obstacle to the insertion, and the vehicular camera 100 can be easily assembled.

Figure 6:
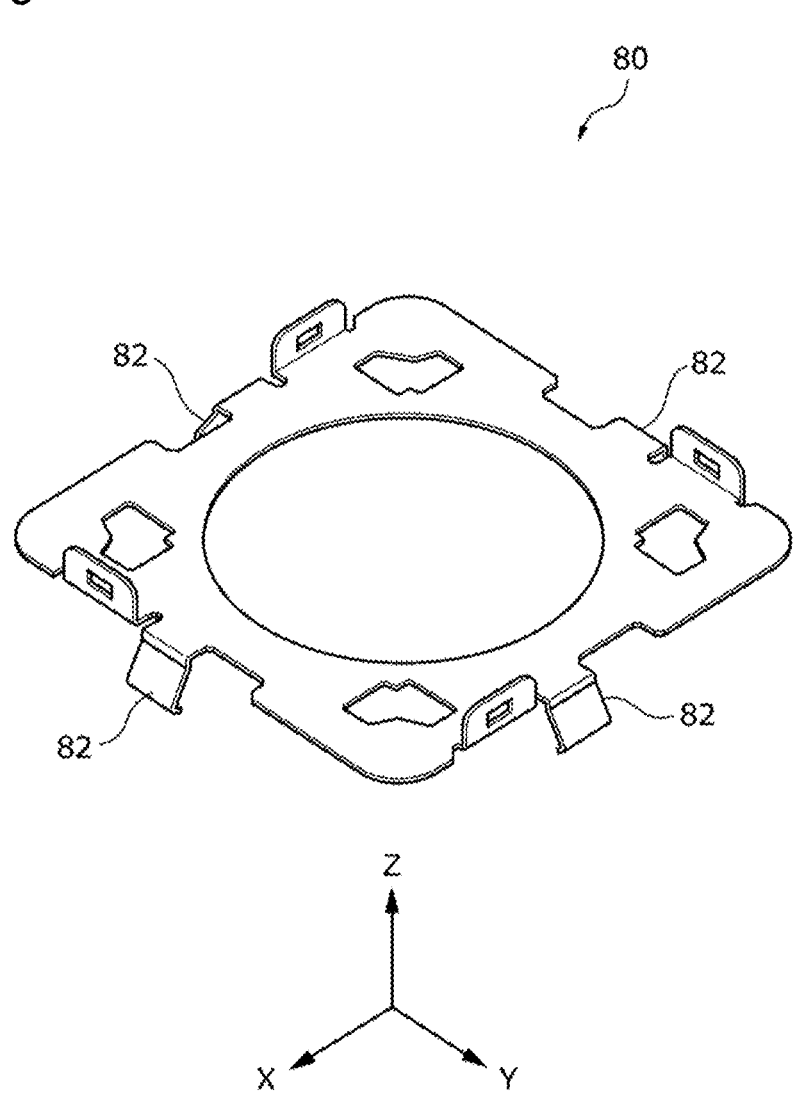
FIG. 6 is a perspective view of a usual second shield.

FIG. 6 is a perspective view of a usual second shield 80. Unlike the embodiment of FIG. 4, in the usual second shield 80, the contact portion 82 extends in the insertion direction of the assembly. Thus, when the lens unit 30 and the second shield 80 are inserted into the housing 60 in a state in which the usual second shield 80 is disposed on the second flange surface 32*b* of the flange portion 32 of the lens unit 30 as shown in FIGS. 5A and 5B, the contact portion 82 is likely to be an obstacle to the insertion (for example, caught on the end portion 63 of the housing 60), and the assembly of the vehicular camera 100 may be complicated.

As shown in FIG. 3B, the shield end 71 of the first shield 70 is disposed at a position closer to the first flange surface 32*a* of the flange portion 32 than at least a part of the contact portion 82 of the second shield 80 that is in contact with the first shield 70. Thus, at least a part of the contact portion 82 of the second shield 80 is reliably in contact with the first shield 70, and thus the conduction between the first shield 70 and the second shield 80 can be ensured, and the first shield 70 and the second shield 80 can be maintained at the same potential.

The contact portion 82 of the second shield 80 is formed by bending a metal. Accordingly, the contact portion 82 can be easily formed. Further, at least a part of the contact portion 82 is a tip portion (for example, a first contact portion 82*a*) of the contact portion 82. The tip portion (for example, the first contact portion 82*a*) is a location where the elastic force that allows the contact portion 82 to expand is largest, and thus it is possible to ensure strong contact between the first shield 70 and the contact portion 82.

Hereinafter, details of the configuration will be further described. The second shield 80 has a first shape having at least a first side 80*a*, a second side 80*b*, a third side 80*c*, and a fourth side 80*d* in a plan view of the second shield 80. At least one contact portion 82 of the second shield 80 includes the first contact portion 82*a*, a second contact portion 82*b*, a third contact portion 82*c*, and a fourth contact portion 82*d*. The first contact portion 82*a* is disposed on the first side 80*a*, the second contact portion 82*b* is disposed on the second side 80*b*, the third contact portion 82*c* is disposed on the third side 80*c*, and the fourth contact portion 82*d* is disposed on the fourth side 80*d*.

That is, the second shield 80 has at least four contact portions 82, and thus it is possible to ensure conduction between the first shield 70 and the second shield 80 more reliably.

The flange portion 32 of the lens unit 30 has a second shape in the plan view of the flange portion 32. The flange end surface 32*c* of the flange portion 32 includes at least a first flange end surface 32*c*1, a second flange end surface 32*c*2, a third flange end surface 32*c*3, and a fourth flange end surface 32*c*4.

Here, the first flange end surface 32*c*1 of the flange portion 32 connects the first flange surface 32*a* and the second flange surface 32*b*, and corresponds to the first side 80*a* and the first contact portion 82*a* of the second shield 80. The second flange end surface 32*c*2 connects the first flange surface 32*a* and the second flange surface 32*b*, and corresponds to the second side 80*b* and the second contact portion 82*b* of the second shield 80. The third flange end surface 32*c*3 connects the first flange surface 32*a* and the second flange surface 32*b*, and corresponds to the third side 80*c* and the third contact portion 82*c* of the second shield 80. The fourth flange end surface connects the first flange surface 32*a* and the second flange surface 32*b*, and corresponds to the fourth side 80*d* and the fourth contact portion 82*d* of the second shield 80.

Accordingly, the flange portion 32 of the lens unit 30 has at least four flange end surfaces 32*c*, and at least four contact portions 82 of the second shield 80 can be disposed along the four flange end surfaces 32*c*.

Furthermore, the first flange end surface 32*c*1 of the flange portion 32 has a first concave portion 33*a* that accommodates the first contact portion 82*a* of the second shield 80. The second flange end surface 32*c*2 has a second concave portion 33*b* that accommodates the second contact portion 82*b* of the second shield 80. The third flange end surface 32*c*3 has a third concave portion 33*c* that accommodates the third contact portion 82*c* of the second shield 80. The fourth flange end surface 32*c*4 has a fourth concave portion 33*d* that accommodates the fourth contact portion 82*d* of the second shield 80.

Each of the first concave portion 33*a* to the fourth concave portion 33*d* is formed by recessing each corresponding flange end surface 32*c* inward (toward the optical axis). Such a concave portion can be formed by, for example, a metal mold for resin injection or cutting the flange end surface 32*c* when the lens unit 30 including the flange portion 32 is formed.

Accordingly, since the concave portion formed in the flange end surface 32*c* accommodates the contact portion 82 of the second shield 80, it is possible to prevent the contact portion 82 from excessively protruding to the housing 60 side beyond the flange end surface 32*c*, and to prevent a gap from being generated between the flange end surface 32*c* and the housing 60.

Furthermore, the second shield 80 includes a first engaging portion 83*a* extending from the second flange surface 32*b* of the flange portion 32 along the first flange end surface 32*c*1 on the first side 80*a*, a second engaging portion 83*b* extending from the second flange surface 32*b* of the flange portion 32 along the second flange end surface 32*c*2 on the second side 80*b*, a third engaging portion 83*c* extending from the second flange surface 32*b* of the flange portion 32 along the third flange end surface 32*c*3 on the third side 80*c* of the second shield, and a fourth engaging portion 83*d* extending from the second flange surface 32*b* of the flange portion 32 along the fourth flange end surface 32*c*4 on the fourth side 80*d* of the second shield.

The first engaging portion 83*a* engages with a first engaged portion 34*a* formed on the first flange end surface 32*c*1 of the flange portion 32 of the lens unit 30. The second engaging portion 83*b* engages with a second engaged portion 34*b* formed on the second flange end surface 32*c*2 of the flange portion 32. The third engaging portion 83*c* engages with a third engaged portion 34*c* formed on the third flange end surface 32*c*3 of the flange portion 32. The fourth engaging portion 83*d* engages with a fourth engaged portion 34*d* formed on the fourth flange end surface 32*c*4 of the flange portion 32.

The second shield 80 can be fixed to the flange portion 32 of the lens unit 30 by engaging the first engaging portion 83*a* to the fourth engaging portion 83*d* of the second shield 80 with the first engaged portion 34*a* to the fourth engaged portion 34*d* of the flange portion 32, respectively.

Figure 7A:
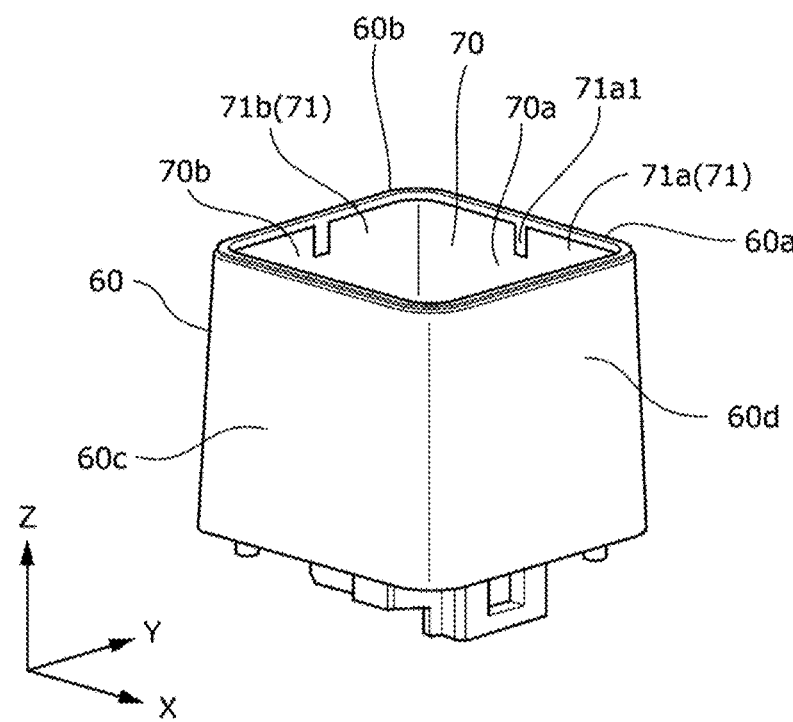
FIG. 7A is a perspective view of a housing accommodating a first shield.
Figure 7B:
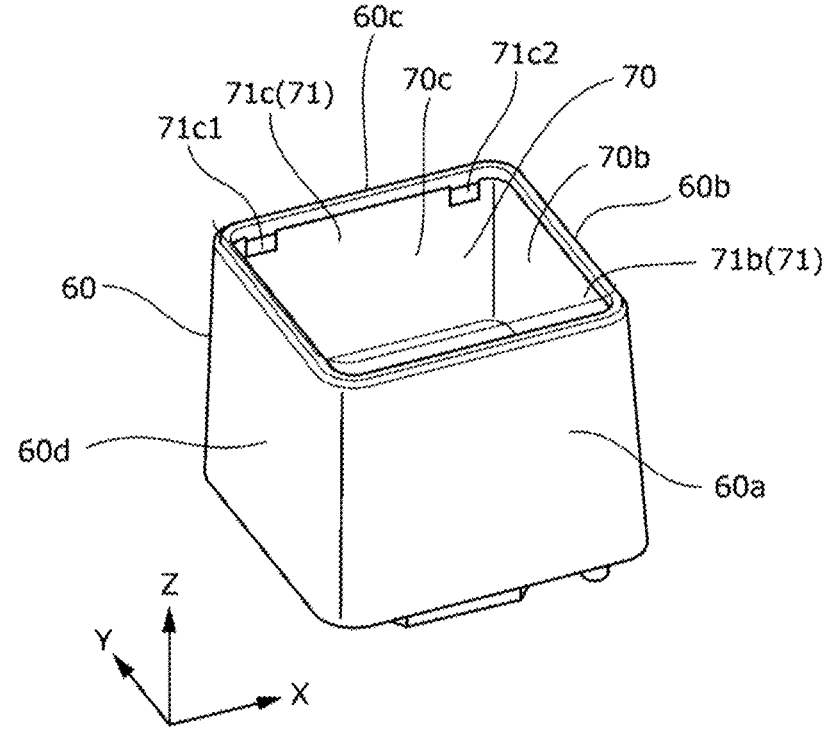
FIG. 7B is a perspective view of a housing accommodating the first shield.

FIG. 7A is a perspective view of the housing 60 accommodating the first shield 70, and FIG. 7B is a perspective view of the housing 60 accommodating the first shield 70. FIG. 7B is a view when viewed in an opposite direction on the XY plane and from a higher position on the Z axis with respect to a viewing direction in FIG. 7A.

The housing 60 includes a first side wall 60*a*, a second side wall 60*b*, a third side wall 60*c* facing the first side wall 60*a*, and a fourth side wall 60*d* facing the second side wall 60*b*. The first side wall 60*a* of the housing 60 corresponds to the first flange end surface 32*c*1 of the flange portion 32, the second side wall 60*b* corresponds to the second flange end surface 32*c*2, the third side wall 60*c* corresponds to the third flange end surface 32*c*3, and the fourth side wall 60*d* corresponds to the fourth flange end surface 32*c*4.

As shown in FIGS. 5A and 5B, the first flange end surface 32*c*1 of the flange portion 32 has a first rib 35*a* that is in contact with an inner surface of the first side wall 60*a* of the housing 60 to position the lens unit 30 on the housing 60. The third flange end surface 32*c*3 facing the first flange end surface 32*c*1 includes a second rib 35*c*1 and a third rib 35*c*2 that are in contact with the inner surface of the third side wall 60*c* of the housing 60 to position the lens unit 30 on the housing 60.

The first rib 35*a* is disposed between the first contact portion 82*a* and the first engaging portion 83*a* of the second shield 80 in a longitudinal direction of the first flange end surface 32*c*1. The second rib 35*c*1 is disposed outside the third contact portion 82*c* of the second shield 80 in a first direction D1 with reference to a center (a center line C-C in FIG. 5B) of the third flange end surface 32*c*3 in a longitudinal direction of the third flange end surface 32*c*3. The third rib 35*c*2 is disposed outside the third engaging portion 83*c* of the second shield 80 in a second direction D2 opposite to the first direction D1 with reference to the center (the center line C-C) of the third flange end surface 32*c*3 in the longitudinal direction of the third flange end surface 32*c*3.

Accordingly, regarding the ribs for positioning the lens unit 30 on the housing 60, at least one rib and at least two ribs are respectively disposed on the opposing first flange end surface 32*c*1 and third flange end surface 32*c*3 of the flange portion 32, and thus the lens unit 30 can be stably positioned on the housing 60.

The second shield 80 further includes a fifth contact portion 82*e* and a sixth contact portion 82*f* on the first side 80*a*, and a seventh contact portion 82*g* on the third side 80*c*. The first contact portion 82*a* and the fifth contact portion 82*e* are disposed adjacent to each other outside the first rib 35*a* in a third direction D3 with reference to the center (the center line C-C) of the first flange end surface 32*c*1 in the longitudinal direction of the first flange end surface 32*c*1. The sixth contact portion 82*f* is disposed outside the first rib 35*a* and the first engaging portion 83*a* of the second shield 80 in a fourth direction D4 opposite to the third direction D3 with reference to the center (the center line C-C) of the first flange end surface 32*c*1 in the longitudinal direction of the first flange end surface 32*c*1. The third contact portion 82*c* and the seventh contact portion 82*g* of the second shield 80 are disposed adjacent to each other in the first direction D1 in the longitudinal direction of the third flange end surface 32*c*3.

Accordingly, the second shield 80 further includes three contact portions 82, and thus it is possible to ensure conduction between the first shield 70 and the second shield 80 more reliably.

Returning to FIGS. 7A and 7B, the first shield 70 includes a first side surface 70*a*, a second side surface 70*b*, a third side surface 70*c* facing the first side surface 70*a*, and a fourth side surface 70*d* (not shown) facing the second side surface 70*b*. The first side surface 70*a* of the first shield 70 corresponds to the first side 80*a* of the second shield 80, the second side surface 70*b* corresponds to the second side 80*b* of the second shield, the third side surface 70*c* corresponds to the third side 80*c* of the second shield, and the fourth side surface 70*d* corresponds to the fourth side 80*d* of the second shield.

Here, at least a part of the first contact portion 82*a*, at least a part of the fifth contact portion 82*e*, and at least a part of the sixth contact portion 82*f* on the first side 80*a* of the second shield 80 are in contact with an inner surface of the first side surface 70*a* of the first shield 70. The third contact portion 82*c* and the seventh contact portion 82*g* on the third side 80*c* of the second shield 80 are in contact with an inner surface of the third side surface 70*c* of the first shield 70.

Accordingly, the three contact portions 82 on the first side 80*a* of the second shield 80 are in contact with the first side surface 70*a* of the first shield 70, and the two contact portions on the third side 80*c* of the second shield 80 are in contact with the third side surface 70*c* of the first shield, and thus it is possible to ensure the conduction between the first shield 70 and the second shield 80 more reliably.

The first concave portion 33*a* of the flange portion 32 accommodates the first contact portion 82*a* and the fifth contact portion 82*e* of the second shield 80, and the third concave portion 33*c* of the flange portion 32 accommodates the third contact portion 82*c* and the seventh contact portion 82*g* of the second shield 80.

Accordingly, the first concave portion 33*a* formed on the flange end surface 32*c* accommodates the two contact portions 82 of the second shield 80, and the third concave portion 33*c* formed on the flange end surface 32*c* accommodates the two contact portions 82 of the second shield 80, and thus it is possible to prevent the contact portion 82 from excessively protruding to the housing 60 side beyond the flange end surface 32c, and to prevent a gap from being generated between the flange end surface 32c and the housing 60.

The first rib 35a of the flange portion 32 is located at the center of the first flange end surface 32c1 of the flange portion 32 of the lens unit 30. Accordingly, since the first rib 35a is located at the center of the first flange end surface 32c1, it is possible to stably position the lens unit 30 on the housing 60.

Further, at least a part of the first contact portion 82a extends obliquely along the first flange end surface 32c1 of the flange portion 32 so as to be separated from the first flange end surface 32c1 of the flange portion 32. At least a part of the second contact portion 82b extends obliquely along the second flange end surface 32c2 of the flange portion 32 so as to be separated from the second flange end surface 32c2 of the flange portion 32. At least a part of the third contact portion 82c extends obliquely along the third flange end surface 32c3 of the flange portion 32 so as to be separated from the third flange end surface 32c3 of the flange portion 32. At least a part of the fourth contact portion 82d extends obliquely along the fourth flange end surface 32c4 of the flange portion 32 so as to be separated from the fourth flange end surface 32c4 of the flange portion 32.

The first engaging portion 83a extends from the second shield 80 along the first flange end surface 32c1 of the flange portion 32. The second engaging portion 83b extends from the second shield 80 along the second flange end surface 32c2 of the flange portion 32. The third engaging portion 83c extends from the second shield 80 along the third flange end surface 32c3 of the flange portion 32. The fourth engaging portion 83d extends from the second shield 80 along the fourth flange end surface 32c4 of the flange portion 32.

Accordingly, the contact portion 82 of the second shield 80 extends obliquely so as to be separated from the flange end surface 32c, and the engaging portion of the second shield 80 extends along the flange end surface 32c. Thus, when the lens unit 30 and the second shield 80 are inserted into the housing 60 in a state in which the second shield 80 is disposed on the second flange surface 32b of the flange portion 32 of the lens unit 30, the contact portion 82 and the engaging portion do not become an obstacle to insertion, and thus the vehicular camera 100 can be easily assembled.

As shown in FIG. 4, the first engaging portion 83a of the second shield 80 has a second hole 83a1, the second engaging portion 83b has a third hole 83b1, the third engaging portion 83c has a fourth hole 83c1, and the fourth engaging portion 83d has a fifth hole 83d1.

The first engaged portion 34a of the flange portion 32 has a first convex portion 34a1 on the first flange end surface 32c1, the second engaged portion 34b has a second convex portion 34b1 on the second flange end surface 32c2, the third engaged portion 34c has a third convex portion 34c1 on the third flange end surface 32c3, and the fourth engaged portion 34d has a fourth convex portion 34d1 on the fourth flange end surface 32c4.

Accordingly, the first convex portion 34a1 of the first engaged portion 34a is fitted into the second hole 83a1 of the first engaging portion 83a, the second convex portion 34b1 of the second engaged portion 34b is fitted into the third hole 83b1 of the second engaging portion 83b, the third convex portion 34c1 of the third engaged portion 34c is fitted into the fourth hole 83c1 of the third engaging portion 83c, and the fourth convex portion 34d1 of the fourth engaged portion 34d is fitted into the fifth hole 83d1 of the fourth engaging portion 83d.

Thus, since the convex portion of the engaged portion is fitted into the hole of the engaging portion, the second shield 80 can be reliably fixed to the flange portion 32 of the lens unit 30.

As shown in FIGS. 7A and 7B, the shield end 71 of the first shield 70 is configured to have a third shape having at least a first shield end 71a, a second shield end 71b, a third shield end 71c facing the first shield end 71a, and a fourth shield end 71d (not shown) facing the second shield end 71b. The first shield end 71a corresponds to the first side 80a of the second shield 80, the second shield end 71b corresponds to the second side 80b of the second shield 80, the third shield end 71c corresponds to the third side 80c of the second shield 80, and the fourth shield end 71d corresponds to the fourth side 80d of the second shield 80.

Furthermore, the first shield end 71a has a fifth concave portion 71a1, and the third shield end 71c has a sixth concave portion 71c1 and a seventh concave portion 71c2.

Thus, the first rib 35a of the flange portion 32 is in contact with the first side wall 60a of the housing 60 through the fifth concave portion 71a1 of the first shield end 71a of the first shield 70, the second rib 35c1 is in contact with the third side wall 60c of the housing 60 through the sixth concave portion 71c1 of the third shield end 71c of the first shield 70, and the third rib 35c2 is in contact with the third side wall 60c of the housing 60 through the seventh concave portion 71c2 of the third shield end 71c of the first shield 70.

Thus, since the rib of the flange portion 32 is in contact with the side wall of the housing 60 through the concave portion of the shield end 71, the lens unit 30 can be stably fixed to the housing 60.

As shown in FIGS. 4, 5A, 5B, 7A, and 7B, a shape of an opening of the first hole 81 of the second shield 80 is a circular shape, the first shape of the second shield 80 is a first quadrilateral shape, the second shape of the flange portion 32 of the lens unit 30 is a second quadrilateral shape, and the third shape of the shield end 71 of the first shield 70 is a third quadrilateral shape.

Thus, the second shield 80, the flange portion 32, and the first shield end 71a each have a quadrilateral shape, and the shape of the opening of the first hole 81 of the second shield 80 is a circular shape, and thus the second shield 80, the flange portion 32, and the first shield 70 can be easily formed.

As shown in FIG. 3A, the end surface 40c of the circuit board 40 has a fourth quadrilateral shape having a first end surface 40c1, a second end surface 40c2, a third end surface 40c3 (not shown) facing the first end surface 40c1, and a fourth end surface 40c4 facing the second end surface 40c2. The first end surface 40c1 faces the inner surface of the first side surface 70a of the first shield, the second end surface 40c2 faces an inner surface of the second side surface 70b of the first shield, the third end surface 40c3 faces the inner surface of the third side surface 70c of the first shield 70, and the fourth end surface 40c4 faces an inner surface of the fourth side surface 70d of the first shield 70. Since the circuit board 40 has a quadrilateral shape, the circuit board 40 can be easily disposed on the first shield 70 having a quadrilateral shape.

From the above, at least the following matters are described in the present disclosure. Components corresponding to those in the embodiment are shown in parentheses, but the present disclosure is not limited thereto.

(1) A vehicular camera (vehicular camera 100) including:
a lens unit (lens unit 30) including at least one lens, a first tubular portion (first tubular portion 37) configured to accommodate the at least one lens, and a flange portion (flange portion 32) formed around the first tubular portion with an optical axis of the lens as a center and having a first flange surface (first flange surface 32$a$), a second flange surface (second flange surface 32$b$) opposite to the first flange surface, and a flange end surface (flange end surface 32$c$) connecting the first flange surface and the second flange surface;

a circuit board (circuit board 40) having a first surface (first surface 40$a$), a second surface (second surface 40$b$) opposite to the first surface, and an end surface (end surface 40$c$) connecting the first surface and the second surface;

an imaging element (imaging element 50) mounted on the first surface of the circuit board and disposed on the optical axis of the at least one lens;

a housing (housing 60) to which the flange portion of the lens unit is fixed, the housing having a second tubular portion (large-diameter tubular portion 61) configured to accommodate at least the circuit board and the imaging element;

a first shield (first shield 70) made of metal and disposed in an internal space formed by the second tubular portion of the housing and the second flange surface of the flange portion of the lens unit so as to surround the circuit board; and a second shield (second shield 80) made of metal and disposed along the second flange surface of the flange portion of the lens unit so as to face the first surface of the circuit board, the second shield having a first hole (first hole 81) corresponding to the imaging element, in which at least a part of the flange end surface of the flange portion of the lens unit faces an inner surface of the first shield, the second shield includes at least one contact portion (contact portion 82) disposed along the flange end surface of the flange portion from the second flange surface of the flange portion on at least one side in a plan view of the flange portion, at least a part of the contact portion of the second shield is in contact with the first shield, and a shield end (shield end 71) of the first shield is disposed at a position closer to the first flange surface of the flange portion than the at least a part of the contact portion of the second shield in a direction along the optical axis.

Accordingly, in the vehicular camera, at least one contact portion of the second shield is disposed along the flange end surface from the second flange surface of the flange portion. Thus, when the lens unit and the second shield are inserted into the housing in a state in which the second shield is disposed on the second flange surface of the flange portion of the lens unit, the contact portion is unlikely to be an obstacle to the insertion, and the vehicular camera can be easily assembled.

Further, the shield end of the first shield is disposed at a position closer to the first flange surface of the flange portion than at least a part of the contact portion of the second shield that is in contact with the first shield. Thus, at least a part of the contact portion of the second shield is reliably in contact with the first shield, and thus conduction between the first shield and the second shield can be ensured, and the first shield and the second shield can be maintained at the same potential.

(2) The vehicular camera according to (1), in which the contact portion of the second shield is formed by bending a metal.

Accordingly, in the vehicular camera, the contact portion of the second shield can be easily formed.

(3) The vehicular camera according to (2), in which the at least a part of the contact portion of the second shield is a tip portion of the contact portion.

Accordingly, in the vehicular camera, it is possible to ensure strong contact between the first shield and the contact portion.

(4) The vehicular camera according to any one of (1) to (3), in which the second shield has a first shape having at least a first side (first side 80$a$), a second side (second side 80$b$), a third side (third side 80$c$), and a fourth side (fourth side 80$d$) in a plan view of the second shield, the at least one contact portion of the second shield includes a first contact portion (first contact portion 82$a$), a second contact portion (second contact portion 82$b$), a third contact portion (third contact portion 82$c$), and a fourth contact portion (fourth contact portion 82$d$), the first contact portion is disposed on the first side, the second contact portion is disposed on the second side, the third contact portion is disposed on the third side, and the fourth contact portion is disposed on the fourth side.

Accordingly, in the vehicular camera, the second shield has at least four contact portions, and thus it is possible to ensure the conduction between the first shield and the second shield more reliably.

(5) The vehicular camera according to (4), in which the flange portion of the lens unit has a second shape in a plan view of the flange portion, the flange end surface of the flange portion of the lens unit has at least a first flange end surface (first flange end surface 32$c$1), a second flange end surface (second flange end surface 32$c$2), a third flange end surface (third flange end surface 32$c$3), and a fourth flange end surface (fourth flange end surface 32$c$4), the first flange end surface of the flange portion connects the first flange surface and the second flange surface and corresponds to the first side and the first contact portion of the second shield, the second flange end surface of the flange portion connects the first flange surface and the second flange surface and corresponds to the second side and the second contact portion of the second shield, the third flange end surface of the flange portion connects the first flange surface and the second flange surface and corresponds to the third side and the third contact portion of the second shield, and the fourth flange end surface of the flange portion connects the first flange surface and the second flange surface and corresponds to the fourth side and the fourth contact portion of the second shield.

Accordingly, in the vehicular camera, the flange portion of the lens unit has at least four flange end surfaces, and at least four contact portions of the second shield can be disposed along the four flange end surfaces.

(6) The vehicular camera according to (5), in which the first flange end surface of the flange portion has a first concave portion (first concave portion 33$a$) configured to accommodate the first contact portion of the second shield, the second flange end surface of the flange portion has a second concave portion (second concave portion 33$b$) configured to accommodate the second contact portion of the second shield, the third flange end surface of the flange portion has a third concave portion (third concave portion 33c) configured to accommodate the third contact portion of the second shield, and the fourth flange end surface of the flange portion has a fourth concave portion (fourth concave portion 33d) configured to accommodate the fourth contact portion of the second shield.

Accordingly, in the vehicular camera, since the concave portion formed in the flange end surface accommodates the contact portion of the second shield, it is possible to prevent the contact portion from excessively protruding to the housing side beyond the flange end surface, and to prevent a gap from being generated between the flange end surface and the housing.

(7) The vehicular camera according to (5), in which the second shield includes:

a first engaging portion (first engaging portion 83a) extending along the first flange end surface from the second flange surface of the flange portion on the first side of the second shield;

a second engaging portion (second engaging portion 83b) extending along the second flange end surface from the second flange surface of the flange portion on the second side of the second shield;

a third engaging portion (third engaging portion 83c) extending along the third flange end surface from the second flange surface of the flange portion on the third side of the second shield; and a fourth engaging portion (fourth engaging portion 83d) extending along the fourth flange end surface from the second flange surface of the flange portion on the fourth side of the second shield, the first engaging portion engages with a first engaged portion (first engaged portion 34a) formed on the first flange end surface of the flange portion of the lens unit, the second engaging portion is engaged with a second engaged portion (second engaged portion 34b) formed on the second flange end surface of the flange portion of the lens unit, the third engaging portion is engaged with a third engaged portion (third engaged portion 34c) formed on the third flange end surface of the flange portion of the lens unit, and the fourth engaging portion is engaged with a fourth engaged portion (fourth engaged portion 34d) formed on the fourth flange end surface of the flange portion of the lens unit.

Accordingly, the second shield can be fixed to the flange portion of the lens unit.

(8) The vehicular camera according to (7), in which the housing includes a first side wall (first side wall 60a), a second side wall (second side wall 60b), a third side wall (third side wall 60c) facing the first side wall, and a fourth side wall (fourth side wall 60d) facing the second side wall, the first side wall of the housing corresponds to the first flange end surface of the flange portion, the second side wall of the housing corresponds to the second flange end surface of the flange portion, the third side wall of the housing corresponds to the third flange end surface of the flange portion, the fourth side wall of the housing corresponds to the fourth flange end surface of the flange portion, the first flange end surface of the flange portion has a first rib (first rib 35a) that is in contact with an inner surface of the first side wall of the housing to position the lens unit on the housing, the third flange end surface of the flange portion facing the first flange end surface includes a second rib (second rib 35c1) and a third rib (third rib 35c2) that are in contact with an inner surface of the third side wall of the housing to position the lens unit on the housing, the first rib of the flange portion is disposed between the first contact portion and the first engaging portion of the second shield in a longitudinal direction of the first flange end surface, the second rib of the flange portion is disposed outside the third contact portion of the second shield in a first direction with reference to a center of the third flange end surface in a longitudinal direction of the third flange end surface, and the third rib of the flange portion is disposed outside the third engaging portion of the second shield in a second direction opposite to the first direction with reference to the center of the third flange end surface in the longitudinal direction of the third flange end surface.

Accordingly, regarding the ribs for positioning the lens unit on the housing, at least one rib and at least two ribs are respectively disposed on the opposing first flange end surface and third flange end surface of the flange portion, and thus the lens unit can be stably positioned on the housing.

(9) The vehicular camera according to (8), in which the second shield further includes a fifth contact portion (fifth contact portion 82e) and a sixth contact portion (sixth contact portion 82f) on the first side of the second shield, and a seventh contact portion (seventh contact portion 82g) on the third side of the second shield, the first contact portion and the fifth contact portion are disposed adjacent to each other outside the first rib in a third direction with reference to a center of the first flange end surface in the longitudinal direction of the first flange end surface, the sixth contact portion is disposed outside the first rib and the first engaging portion of the second shield in a fourth direction opposite to the third direction with reference to the center of the first flange end surface in the longitudinal direction of the first flange end surface, and the third contact portion and the seventh contact portion of the second shield are disposed adjacent to each other in the first direction in the longitudinal direction of the third flange end surface.

Accordingly, in the vehicular camera, the second shield further includes three contact portions, and thus it is possible to ensure the conduction between the first shield and the second shield more reliably.

(10) The vehicular camera according to (9), in which the first shield includes a first side surface (first side surface 70a), a second side surface (second side surface 70b), a third side surface (third side surface 70c) facing the first side surface, and a fourth side surface (fourth side surface 70d) facing the second side surface, the first side surface of the first shield corresponds to the first side of the second shield, the second side surface of the first shield corresponds to the second side of the second shield, the third side surface of the first shield corresponds to the third side of the second shield, the fourth side surface of the first shield corresponds to the fourth side of the second shield, at least a part of the first contact portion, at least a part of the fifth contact portion, and at least a part of the sixth contact portion on the first side of the second shield are in contact with an inner surface of the first side surface of the first shield, and the third contact portion and the seventh contact portion on the third side of the second shield are in contact with an inner surface of the third side surface of the first shield.

Accordingly, in the vehicular camera, the three contact portions on the first side of the second shield are in contact with the first side surface of the first shield, and the two contact portions on the third side of the second shield are in contact with the third side surface of the first shield, and thus it is possible to ensure the conduction between the first shield and the second shield more reliably.

(11) The vehicular camera according to (9), in which
the first concave portion of the flange portion accommodates the first contact portion and the fifth contact portion of the second shield, and the third concave portion of the flange portion accommodates the third contact portion and the seventh contact portion of the second shield.

Accordingly, in the vehicular camera, the first concave portion formed on the flange end surface accommodates the two contact portions of the second shield, and the third concave portion formed on the flange end surface accommodates the two contact portions of the second shield, and thus it is possible to prevent the contact portion from excessively protruding to the housing side beyond the flange end surface, and to prevent a gap from being generated between the flange end surface and the housing.

(12) The vehicular camera according to (9), in which
the first rib of the flange portion is located at the center of the first flange end surface of the flange portion of the lens unit.

Accordingly, in the vehicular camera, since the first rib is located at the center of the first flange end surface, it is possible to stably position the lens unit on the housing.

(13) The vehicular camera according to (7), in which
the at least a part of the first contact portion extends obliquely along the first flange end surface of the flange portion so as to be separated from the first flange end surface of the flange portion, at least a part of the second contact portion extends obliquely along the second flange end surface of the flange portion so as to be separated from the second flange end surface of the flange portion, at least a part of the third contact portion extends obliquely along the third flange end surface of the flange portion so as to be separated from the third flange end surface of the flange portion, at least a part of the fourth contact portion extends obliquely along the fourth flange end surface of the flange portion so as to be separated from the fourth flange end surface of the flange portion, the first engaging portion extends from the second shield along the first flange end surface of the flange portion, the second engaging portion extends from the second shield along the second flange end surface of the flange portion, the third engaging portion extends from the second shield along the third flange end surface of the flange portion, and the fourth engaging portion extends from the second shield along the fourth flange end surface of the flange portion.

Accordingly, in the vehicular camera, the contact portion of the second shield extends obliquely so as to be separated from the flange end surface and the engaging portion of the second shield extends along the flange end surface. Thus, when the lens unit and the second shield are inserted into the housing in a state in which the second shield is disposed on the second flange surface of the flange portion of the lens unit, the contact portion and the engaging portion do not become an obstacle to insertion, and thus the vehicular camera can be easily assembled.

(14) The vehicular camera according to (13), in which
the first engaging portion of the second shield has a second hole (second hole $83a1$), the second engaging portion of the second shield has a third hole (third hole $83b1$), the third engaging portion of the second shield has a fourth hole (fourth hole $83c1$), the fourth engaging portion of the second shield has a fifth hole (fifth hole $83d1$), the first engaged portion of the flange portion has a first convex portion (first convex portion $34a1$) on the first flange end surface of the flange portion, the second engaged portion of the flange portion has a second convex portion (second convex portion $34b1$) on the second flange end surface of the flange portion, the third engaged portion of the flange portion has a third convex portion (third convex portion $34c1$) on the third flange end surface of the flange portion, the fourth engaged portion of the flange portion has a fourth convex portion (fourth convex portion $34d1$) on the fourth flange end surface of the flange portion, the first convex portion of the first engaged portion is fitted into the second hole of the first engaging portion, the second convex portion of the second engaged portion is fitted into the third hole of the second engaging portion, the third convex portion of the third engaged portion is fitted into the fourth hole of the third engaging portion, and the fourth convex portion of the fourth engaged portion is fitted into the fifth hole of the fourth engaging portion.

Accordingly, in the vehicular camera, since the convex portion of the engaged portion is fitted into the hole of the engaging portion, the second shield can be reliably fixed to the flange portion of the lens unit.

(15) The vehicular camera according to (10), in which
the shield end of the first shield is configured to have a third shape having at least a first shield end (first shield end $71a$), a second shield end (second shield end $71b$), a third shield end (third shield end $71c$) facing the first shield end, and a fourth shield end (fourth shield end $71d$) facing the second shield end, the first shield end of the first shield corresponds to the first side of the second shield, the second shield end of the first shield corresponds to the second side of the second shield, the third shield end of the first shield corresponds to the third side of the second shield, the fourth shield end of the first shield corresponds to the fourth side of the second shield, the first shield end of the first shield has a fifth concave portion (fifth concave portion $71a1$),

the third shield end of the first shield has a sixth concave portion (sixth concave portion 71c1) and a seventh concave portion (seventh concave portion 71c2), the first rib of the flange portion is in contact with the first side wall of the housing through the fifth concave portion of the first shield end of the first shield, the second rib of the flange portion is in contact with the third side wall of the housing through the sixth concave portion of the third shield end of the first shield, and the third rib of the flange portion is in contact with the third side wall of the housing through the seventh concave portion of the third shield end of the first shield.

Accordingly, in the vehicular camera, since the rib of the flange portion is in contact with the side wall of the housing through the concave portion of the shield end, the lens unit can be stably fixed to the housing.

(16) The vehicular camera according to (15), in which a shape of an opening of the first hole of the second shield is a circular shape, the first shape of the second shield is a first quadrilateral shape, the second shape of the flange portion of the lens unit is a second quadrilateral shape, and the third shape of the shield end of the first shield is a third quadrilateral shape.

Accordingly, in the vehicular camera, the second shield, the flange portion, and the shield end of the first shield each have a quadrilateral shape, and the shape of the opening of the first hole of the second shield is a circular shape, and thus the second shield, the flange portion, and the first shield can be easily formed.

(17) The vehicular camera according to (16), in which the end surface of the circuit board has a fourth quadrilateral shape having a first end surface (first end surface 40c1), a second end surface (second end surface 40c2), a third end surface (third end surface 40c3) facing the first end surface, and a fourth end surface (fourth end surface 40c4) facing the second end surface, the first end surface of the circuit board faces the inner surface of the first side surface of the first shield, the second end surface of the circuit board faces an inner surface of the second side surface of the first shield, the third end surface of the circuit board faces the inner surface of the third side surface of the first shield, and the fourth end surface of the circuit board faces an inner surface of the fourth side surface of the first shield.

Accordingly, in the vehicular camera, since the circuit board has a quadrilateral shape, the circuit board can be easily disposed on the first shield having a quadrilateral shape.

Although the embodiment has been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiment described above may be freely combined without departing from the gist of the invention.

INDUSTRIAL APPLICABILITY

The present disclosure is useful as a vehicular camera that can be manufactured at low cost and ensures excellent imaging performance.

20

What is claimed is:

1. A vehicular camera comprising:

a lens unit including at least one lens, a first tubular portion configured to accommodate the at least one lens, and a flange portion formed around the first tubular portion with an optical axis of the lens as a center and having a first flange surface, a second flange surface opposite to the first flange surface, and a flange end surface connecting the first flange surface and the second flange surface;

a circuit board having a first surface, a second surface opposite to the first surface, and an end surface connecting the first surface and the second surface;

an imaging element mounted on the first surface of the circuit board and disposed on the optical axis of the at least one lens;

a housing to which the flange portion of the lens unit is fixed, the housing having a second tubular portion configured to accommodate at least the circuit board and the imaging element;

a first shield made of metal and disposed in an internal space formed by the second tubular portion of the housing and the second flange surface of the flange portion of the lens unit so as to surround the circuit board; and a second shield made of metal and disposed along the second flange surface of the flange portion of the lens unit so as to face the first surface of the circuit board, the second shield having a first hole corresponding to the imaging element, wherein at least a part of the flange end surface of the flange portion of the lens unit faces an inner surface of the first shield, the second shield includes at least one contact portion disposed along the flange end surface of the flange portion from the second flange surface of the flange portion on at least one side in a plan view of the flange portion, at least a part of the contact portion of the second shield is in contact with the first shield, and a shield end of the first shield is disposed at a position closer to the first flange surface of the flange portion than the at least a part of the contact portion of the second shield in a direction along the optical axis.

2. The vehicular camera according to claim 1, wherein the contact portion of the second shield is formed by bending a metal.

3. The vehicular camera according to claim 2, wherein the at least a part of the contact portion of the second shield is a tip portion of the contact portion.

4. The vehicular camera according to claim 1, wherein the second shield has a first shape having at least a first side, a second side, a third side, and a fourth side in a plan view of the second shield, the at least one contact portion of the second shield includes a first contact portion, a second contact portion, a third contact portion, and a fourth contact portion, the first contact portion is disposed on the first side, the second contact portion is disposed on the second side, the third contact portion is disposed on the third side, and the fourth contact portion is disposed on the fourth side.

5. The vehicular camera according to claim 4, wherein the flange portion of the lens unit has a second shape in a plan view of the flange portion, the flange end surface of the flange portion of the lens unit has at least a first flange end surface, a second flange end surface, a third flange end surface, and a fourth flange end surface, the first flange end surface of the flange portion connects the first flange surface and the second flange surface and corresponds to the first side and the first contact portion of the second shield, the second flange end surface of the flange portion connects the first flange surface and the second flange surface and corresponds to the second side and the second contact portion of the second shield, the third flange end surface of the flange portion connects the first flange surface and the second flange surface and corresponds to the third side and the third contact portion of the second shield, and the fourth flange end surface of the flange portion connects the first flange surface and the second flange surface and corresponds to the fourth side and the fourth contact portion of the second shield.

6. The vehicular camera according to claim 5, wherein the first flange end surface of the flange portion has a first concave portion configured to accommodate the first contact portion of the second shield, the second flange end surface of the flange portion has a second concave portion configured to accommodate the second contact portion of the second shield, the third flange end surface of the flange portion has a third concave portion configured to accommodate the third contact portion of the second shield, and the fourth flange end surface of the flange portion has a fourth concave portion configured to accommodate the fourth contact portion of the second shield.

7. The vehicular camera according to claim 5, wherein the second shield includes:

a first engaging portion extending along the first flange end surface from the second flange surface of the flange portion on the first side of the second shield;

a second engaging portion extending along the second flange end surface from the second flange surface of the flange portion on the second side of the second shield;

a third engaging portion extending along the third flange end surface from the second flange surface of the flange portion on the third side of the second shield; and a fourth engaging portion extending along the fourth flange end surface from the second flange surface of the flange portion on the fourth side of the second shield, the first engaging portion engages with a first engaged portion formed on the first flange end surface of the flange portion of the lens unit, the second engaging portion is engaged with a second engaged portion formed on the second flange end surface of the flange portion of the lens unit, the third engaging portion is engaged with a third engaged portion formed on the third flange end surface of the flange portion of the lens unit, and the fourth engaging portion is engaged with a fourth engaged portion formed on the fourth flange end surface of the flange portion of the lens unit.

8. The vehicular camera according to claim 7, wherein the housing includes a first side wall, a second side wall, a third side wall facing the first side wall, and a fourth side wall facing the second side wall, the first side wall of the housing corresponds to the first flange end surface of the flange portion, the second side wall of the housing corresponds to the second flange end surface of the flange portion, the third side wall of the housing corresponds to the third flange end surface of the flange portion, the fourth side wall of the housing corresponds to the fourth flange end surface of the flange portion, the first flange end surface of the flange portion has a first rib that is in contact with an inner surface of the first side wall of the housing to position the lens unit on the housing, the third flange end surface of the flange portion facing the first flange end surface includes a second rib and a third rib that are in contact with an inner surface of the third side wall of the housing to position the lens unit on the housing, the first rib of the flange portion is disposed between the first contact portion and the first engaging portion of the second shield in a longitudinal direction of the first flange end surface, the second rib of the flange portion is disposed outside the third contact portion of the second shield in a first direction with reference to a center of the third flange end surface in a longitudinal direction of the third flange end surface, and the third rib of the flange portion is disposed outside the third engaging portion of the second shield in a second direction opposite to the first direction with reference to the center of the third flange end surface in the longitudinal direction of the third flange end surface.

9. The vehicular camera according to claim 8, wherein the second shield further includes:

a fifth contact portion and a sixth contact portion on the first side of the second shield; and a seventh contact portion on the third side of the second shield, the first contact portion and the fifth contact portion are disposed adjacent to each other outside the first rib in a third direction with reference to a center of the first flange end surface in the longitudinal direction of the first flange end surface, the sixth contact portion is disposed outside the first rib and the first engaging portion of the second shield in a fourth direction opposite to the third direction with reference to the center of the first flange end surface in the longitudinal direction of the first flange end surface, and the third contact portion and the seventh contact portion of the second shield are disposed adjacent to each other in the first direction in the longitudinal direction of the third flange end surface.

10. The vehicular camera according to claim 9, wherein the first shield includes a first side surface, a second side surface, a third side surface facing the first side surface, and a fourth side surface facing the second side surface, the first side surface of the first shield corresponds to the first side of the second shield, the second side surface of the first shield corresponds to the second side of the second shield, the third side surface of the first shield corresponds to the third side of the second shield, the fourth side surface of the first shield corresponds to the fourth side of the second shield, at least a part of the first contact portion, at least a part of the fifth contact portion, and at least a part of the sixth contact portion on the first side of the second shield are in contact with an inner surface of the first side surface of the first shield, and the third contact portion and the seventh contact portion on the third side of the second shield are in contact with an inner surface of the third side surface of the first shield.

11. The vehicular camera according to claim 10, wherein the shield end of the first shield is configured to have a third shape having at least a first shield end, a second shield end, a third shield end facing the first shield end, and a fourth shield end facing the second shield end, the first shield end of the first shield corresponds to the first side of the second shield, the second shield end of the first shield corresponds to the second side of the second shield, the third shield end of the first shield corresponds to the third side of the second shield, the fourth shield end of the first shield corresponds to the fourth side of the second shield, the first shield end of the first shield has a fifth concave portion, the third shield end of the first shield has a sixth concave portion and a seventh concave portion, the first rib of the flange portion is in contact with the first side wall of the housing through the fifth concave portion of the first shield end of the first shield, the second rib of the flange portion is in contact with the third side wall of the housing through the sixth concave portion of the third shield end of the first shield, and the third rib of the flange portion is in contact with the third side wall of the housing through the seventh concave portion of the third shield end of the first shield.

12. The vehicular camera according to claim 11, wherein a shape of an opening of the first hole of the second shield is a circular shape, the first shape of the second shield is a first quadrilateral shape, the second shape of the flange portion of the lens unit is a second quadrilateral shape, and the third shape of the shield end of the first shield is a third quadrilateral shape.

13. The vehicular camera according to claim 12, wherein the end surface of the circuit board has a fourth quadrilateral shape having a first end surface, a second end surface, a third end surface facing the first end surface, and a fourth end surface facing the second end surface, the first end surface of the circuit board faces the inner surface of the first side surface of the first shield, the second end surface of the circuit board faces an inner surface of the second side surface of the first shield, the third end surface of the circuit board faces the inner surface of the third side surface of the first shield, and the fourth end surface of the circuit board faces an inner surface of the fourth side surface of the first shield.

14. The vehicular camera according to claim 9, wherein the first concave portion of the flange portion accommodates the first contact portion and the fifth contact portion of the second shield, and the third concave portion of the flange portion accommodates the third contact portion and the seventh contact portion of the second shield.

15. The vehicular camera according to claim 9, wherein the first rib of the flange portion is located at the center of the first flange end surface of the flange portion of the lens unit.

16. The vehicular camera according to claim 7, wherein the at least a part of the first contact portion extends obliquely along the first flange end surface of the flange portion so as to be separated from the first flange end surface of the flange portion, at least a part of the second contact portion extends obliquely along the second flange end surface of the flange portion so as to be separated from the second flange end surface of the flange portion, at least a part of the third contact portion extends obliquely along the third flange end surface of the flange portion so as to be separated from the third flange end surface of the flange portion, at least a part of the fourth contact portion extends obliquely along the fourth flange end surface of the flange portion so as to be separated from the fourth flange end surface of the flange portion, the first engaging portion extends from the second shield along the first flange end surface of the flange portion, the second engaging portion extends from the second shield along the second flange end surface of the flange portion, the third engaging portion extends from the second shield along the third flange end surface of the flange portion, and the fourth engaging portion extends from the second shield along the fourth flange end surface of the flange portion.

17. The vehicular camera according to claim 16, wherein the first engaging portion of the second shield has a second hole, the second engaging portion of the second shield has a third hole, the third engaging portion of the second shield has a fourth hole, the fourth engaging portion of the second shield has a fifth hole, the first engaged portion of the flange portion has a first convex portion on the first flange end surface of the flange portion, the second engaged portion of the flange portion has a second convex portion on the second flange end surface of the flange portion, the third engaged portion of the flange portion has a third convex portion on the third flange end surface of the flange portion, the fourth engaged portion of the flange portion has a fourth convex portion on the fourth flange end surface of the flange portion, the first convex portion of the first engaged portion is fitted into the second hole of the first engaging portion, the second convex portion of the second engaged portion is fitted into the third hole of the second engaging portion, the third convex portion of the third engaged portion is fitted into the fourth hole of the third engaging portion, and the fourth convex portion of the fourth engaged portion is fitted into the fifth hole of the fourth engaging portion.

* * * * *